US012585600B1

(12) United States Patent
Brueggen

(10) Patent No.: US 12,585,600 B1
(45) Date of Patent: Mar. 24, 2026

(54) UNIFIED INSTRUCTION PROCESSOR FOR DIRECT MEMORY ACCESS SCATTER/GATHER ENGINE

(71) Applicant: Hewlett Packard Enterprise Development LP, Spring, TX (US)

(72) Inventor: Christopher M. Brueggen, Allen, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/926,024

(22) Filed: Oct. 24, 2024

(51) Int. Cl.
| *G06F 13/28* | (2006.01) |
| *G06F 3/06* | (2006.01) |
| *G06F 9/30* | (2018.01) |

(52) U.S. Cl.
CPC ............ *G06F 13/28* (2013.01); *G06F 3/0659* (2013.01); *G06F 9/30065* (2013.01)

(58) Field of Classification Search
CPC ..... G06F 13/28; G06F 3/0659; G06F 9/30065
See application file for complete search history.

(56) References Cited

U.S. PATENT DOCUMENTS

| 7,673,072 | B2 * | 3/2010 | Boucher | G06F 13/385 |
| | | | | 709/239 |
| 8,176,252 | B1 * | 5/2012 | Alexander | G06F 13/28 |
| | | | | 710/22 |
| 9,344,490 | B2 * | 5/2016 | Bloch | G06F 9/546 |
| 2002/0138697 | A1 * | 9/2002 | Kanda | G06F 13/28 |
| | | | | 710/22 |
| 2017/0153993 | A1 * | 6/2017 | Palmer | G06F 15/17375 |
| 2018/0203815 | A1 * | 7/2018 | Rochford | G06F 5/065 |
| 2024/0143525 | A1 * | 5/2024 | Chen | G06F 13/28 |

* cited by examiner

*Primary Examiner* — Corey S Faherty
(74) *Attorney, Agent, or Firm* — Yao Legal Services, Inc.

(57) ABSTRACT
A system receives, by a network interface card (NIC), inputs including an instruction to read or write a payload of a message, a tracker state indicating a round of processing, and a datatype descriptor defining organization of the message payload. The system identifies a current context and a processing state for the instruction. If the datatype descriptor indicates a first type, the system: obtains the current context associated with the first type from a host memory or a cache of the NIC; and creates direct memory access (DMA) instructions corresponding to the received instruction by executing operations in a nested loop. If the datatype descriptor indicates a second type, the system: obtains the current context associated with the second type by fetching vector entries from a buffer of the NIC; and creates the DMA instructions corresponding to the received instruction based on addresses and lengths in the vector entries.

20 Claims, 16 Drawing Sheets

300

| ELEMENT 302 | DESCRIPTION 304 |
|---|---|
| stridez [31:0] | Stride value in z dimension |
| stridey [31:0] | Stride value in y dimension |
| stridex [31:0] | Stride value in x dimension |
| elementsz [15:0] | Total number of elements in z dimension |
| elementsy [15:0] | Total number of elements in y dimension |
| elementsx [15:0] | Total number of elements in x dimension |
| vb_last [7:0] | Number of valid bytes in the last element in the x dimension (may be different than vld_bytes) |
| vld_bytes [7:0] | Number of valid bytes in a data element when a byte mask is used |
| do_byte_masking | Indicates when byte-masking should be performed |
| last_partial | Indicates when the last element in the x dimension is a partial element |
| dsc_type | Set to 1, indicating Derived-DT formatted Descriptor |
| block_size [8:0] | Size of data element (max 256) |
| bs_last [7:0] | Size of last (partial) data element in x dimension (applicable if last_partial = 1) |
| length [39:0] | Total byte length of payload to be transferred (possibly in multiple packets) |
| address [63:0] | Base address of Context-FF array in host memory |

```
struct element {
    int a;
    float b;
    uint8_t c;
    double d;
};
struct element AoE[80][100][200];
int x, y, z;
```
342

```
//Send face yx
for(y=0; y < 100; y++)
  for(x=0; x< 200; x++) {
    send(AoE[0][y][x].b);
    send(AoE[0][y][x].d);
}
```
344

```
//Send face zy
for(z=0; z< 80; z++)
  for(y=0; y < 100; y++) {
    send(AoE[z][y][0].b);
    send(AoE[z][y][0].d);
}
```
346

```
//Send face zx
for(z=0; z< 80; z++)
  for(x=0; x< 200; x++) {
    send(AoE[z][0][x].b);
    send(AoE[z][0][x].d);
}
```
348

| ELEMENT 362 | DESCRIPTION 364 |
|---|---|
| nk_enc [2:0] | Defines the value of nk with respect to ent_per_nk: 2=4k, 5=32k, 6=64k (other values may not be supported) |
| ent_per_nk [15:0] | Number of IOVEC entries addressing nk bytes of payload |
| alignment [15:0] | Offset of the alignment point into the entry. Applicable when ent_per_nk==1, indicating a storage-type IOVEC, where all IOVEC entries have a common length value, except possibly the first and last. The alignment value will be equal to the length value in the first IOVEC entry |
| entries [31:0] | Total number of entries in the IOVEC |
| vld_bytes [7:0] | Number of valid bytes in a data element when a byte mask is used |
| do_byte_masking | Indicates when byte-masking should be performed |
| relative | Indicates if the IOVEC uses relative address (1) or absolute addressing (0) |
| dsc_type | Set to 0, indicating IOVEC-DT formatted Descriptor |
| block_size [8:0] | Size of data element (max 256) |
| length [39:0] | Total byte length of payload to be transferred (possibly in multiple packets) |
| address [63:0] | Base address of IOVEC in host memory |

```
// 1) MAC unit inputs are mac_start[1:0]
// 2) MAC unit outputs are mac_done, addr_offset, stridey_adj, stridez_adj
// 3)  "tracker_ent_first_round" means this is the first round of processing
//      for the engine tracker entry.
// 4) "start_of_message" means the first packet of the overall message is being
//      processed.
// 5) In general, DT_Offset is the byte offset of the start of the packet being
//      processed within the overall message payload.
// 6) "Context_FF_from_DT_Offset" indicates that a Get Response packet is being
//      processed, and Context-Fastforward was previously calculated when the
//      corresponding Get Request was issued, and is being provided as an
//      overload of the DT_Offset value.
// 7) "icb_entry_avail" means an ICB entry is available for allocation.
```

502

```
If (not first cycle of current processing round),
    curr_context = <context from previous processing cycle>
    ddt_proc_stt = <Loop_Exec>
```

510

```
Else if (tracker_ent_first_round && start_of_message),
    curr_context = <initial_context> // loop counters, etc. = 0
    curr_context.stridey_adj = <stridey_adj_from_MAC_unit>
    curr_context.stridez_adj = <stridez_adj_from_MAC_unit>
    ddt_proc_stt = mac_done ? <Loop_Exec> : <MAC_wait>
    mac_start[1] = 1 // addr_offset=0, don't need MAC unit to calculate it
```

512

```
Else if (Context found during Dpipe traversal),
    If (inp_context.type == IOVEC),
        curr_context = <copy_from_ICB_entry> // Context-FF previously fetched
                                            // from host memory
        curr_context.stridey_adj = <stridey_adj_from_MAC_unit>
        curr_context.stridez_adj = <stridez_adj_from_MAC_unit>
        curr_context.addr_offset = <addr_offset_from_MAC_unit>
        ddt_proc_stt = mac_done ? <Loop_Exec> : <MAC_wait> mac_start[0] = 1
    Else,
        curr_context = <copy_from_inp_context>
        ddt_proc_stt = <Loop_Exec>
```

514

```
Else if (Context_FF_from_DT_Offset),
    curr_context = <copy_from_DT_Offset> // Context-FF overloads DT offset
                                        // input to processor
    curr_context.stridey_adj = <stridey_adj_from_MAC_unit>
    curr_context.stridez_adj = <stridez_adj_from_MAC_unit>
    curr_context.addr_offset = <addr_offset_from_MAC_unit>
    ddt_proc_stt = mac_done ? <Loop_Exec> : <MAC_wait>
    mac_start[0] = 1
```

516

```
Else,
    curr_context = <initial_IOVEC_context> // all zeros
    ddt_proc_stt = icb_entry_avail ? <CFF_Fetch> : <Skip>
    // If ddt_proc_stt = <CFF_Fetch>, allocate ICB entry and record it in
    // ICB_List[0] in context and issue DMA read instruction to fetch
    // Context-FastForward from host memory.
    // If ddt_proc_stt = <Skip>, store newly created context and
    // return tracker entry to bidding state
```

650 { addr_offset = (currentz * stridez) + (currenty * stridey) + (currentx * stridex)
652 { stridey_adj = stridex * (elementsx-1) // subtract this before adding stridey
654 { stridez_adj = stridey * (elementsy-1) // subtract this before adding stridez

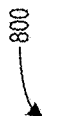

```
// 1)  MAC unit inputs are mac_start[2].
// 2)  MAC unit outputs are mac_done, mac_dtseqn_epnk (= IOVEC entry number).
// 3)  "tracker_ent_first_round" means this is the first round of processing for the engine tracker entry.
// 4)  "start_of_message" means the first packet of the overall message is being processed.
// 5)  "inp_context.pkt_dn" means packet payload transfer has completed.
// 6)  "inp_context.noproc" means this is a round of Null processing used for context transfer.
// 7)  "do_icb_wait" means unable to process an IOVEC entry, but need to wait for the ICB entry to be presented
//      to the processor so it can be accepted (then end the round of processing).
// 8)  "icb_list_sh_last_cyc" means the ICB entry list in context was right-shifted in the previous cycle,
//      so the new head-of-list ICB entry has not yet been read.
// 9)  "did_ie_proc_ie_fetch" means that we've already done an IE_Proc ⊠ IE_Fetch state transition in this round of processing.
// 10) "ctxt_icb_valid[0]" means the head-of-list ICB entry is valid (already contains an IOVEC Entry group
//      fetched from host memory).
// 11) "inp_instr.trk_estt.stail" means no follower instruction has arrived that final context could be transferred to.
// 12) "inst_PRQ" means this processor is in the "Put-Request" (DMA gather) engine instance.
// 13) "inp_instr.eom" means there's no follower instruction to transfer final context to."ie_fetch_none" means
//      don't fetch any more IOVEC entry groups.
// 14) "icb_ent_avail" means there are one or more ICB entries available for allocation.
// 15) "not_eligible_for_pyld_xfer" means cannot yet perform payload transfer for the tracker entry being processed.
//      It is currently only eligible for prefetch of IOVEC entries.
// 16) "icb_refcnt_acc" means ICB can accept a reference count update command.
// 17) "desc_idt.ent_per_nk" is the number of IOVEC entries mapped to n kB of message payload
//      (n is encoded separately in the descriptor).
//      If ent_per_nk>1, must use the MAC unit to calculate the IOVEC entry number.
```

```
      // Identify current context
812 { If (Not first cycle of current processing round),
         cur_context = <context from previous processing cycle>
      Else if (tracker_ent_first_round && start_of_message),
814 {    cur_context = <initial_context> // all zeroes
         cur_context.ctxt_enc = 1 // IOVEC processing context format
816 { Else if (Context found during Dpipe traversal),
         cur_context = <copy_from_inp_context>
      Else,
818 {    cur_context = <initial_context> // all zeroes
         cur_context.ctxt_enc = 1 // IOVEC processing context format // Identify processing state
      If (Context found during Dpipe traversal),
         If (inp_context.pkt_dn || inp_instr.noproc),
            idt_proc_stt = <Skip>
         Else if (do_icb_wait), idt_proc_stt = <ICB_Wait>
         Else if (icb_list_sh_last_cyc &&
               !did_ie_proc_or_ie_fetch and ctxt_icb_valid[0]),
            If ((!inp_instr.trk_estt.stail || (inst_PRQ & !inp_instr.eom)) &
                  !ie_fetch_none & icb_ent_avail),
820 {         idt_proc_stt = <IE_Fetch> // fetch another IOVEC entry group
            Else if (not_eligible_for_pyld_xfer),
               If (ICB entry was read), idt_proc_stt = icb_vld ? <Skip> : <ICB_Wait>
               Else, idt_proc_stt = <Skip>
            Else,
               idt_proc_stt = icb_vld ? icb_refcnt_acc ?
                     <IE_Proc> : <Skip> : <ICB_Wait>
         Else,
            idt_proc_stt = ie_fetch_none ? <Skip> : icb_ent_avail ? <IE_Fetch> : <Skip>
      Else if (First cycle of this round of processing),
         If (icb_ent_avail),
            If (desc_idt.ent_per_nk==1), idt_proc_stt = <IE_Fetch>
            Else,
822 {         idt_proc_stt = mac_done ? <IE_Fetch> : <MAC_Wait>
               mac_start[2] = (idt_proc_stt!=<MAC_Wait>)
            Else,
               idt_proc_stt = (last_idt_proc_stt==<MAC_Wait> &&
                     !mac_done) ? <MAC_Wait> : <Skip>
824 { Else,
         idt_proc_stt = !icb_ent_avail ? <Skip> : ie_fetch_none ? <Skip> : <IE_Fetch>
```

FIG. 8B

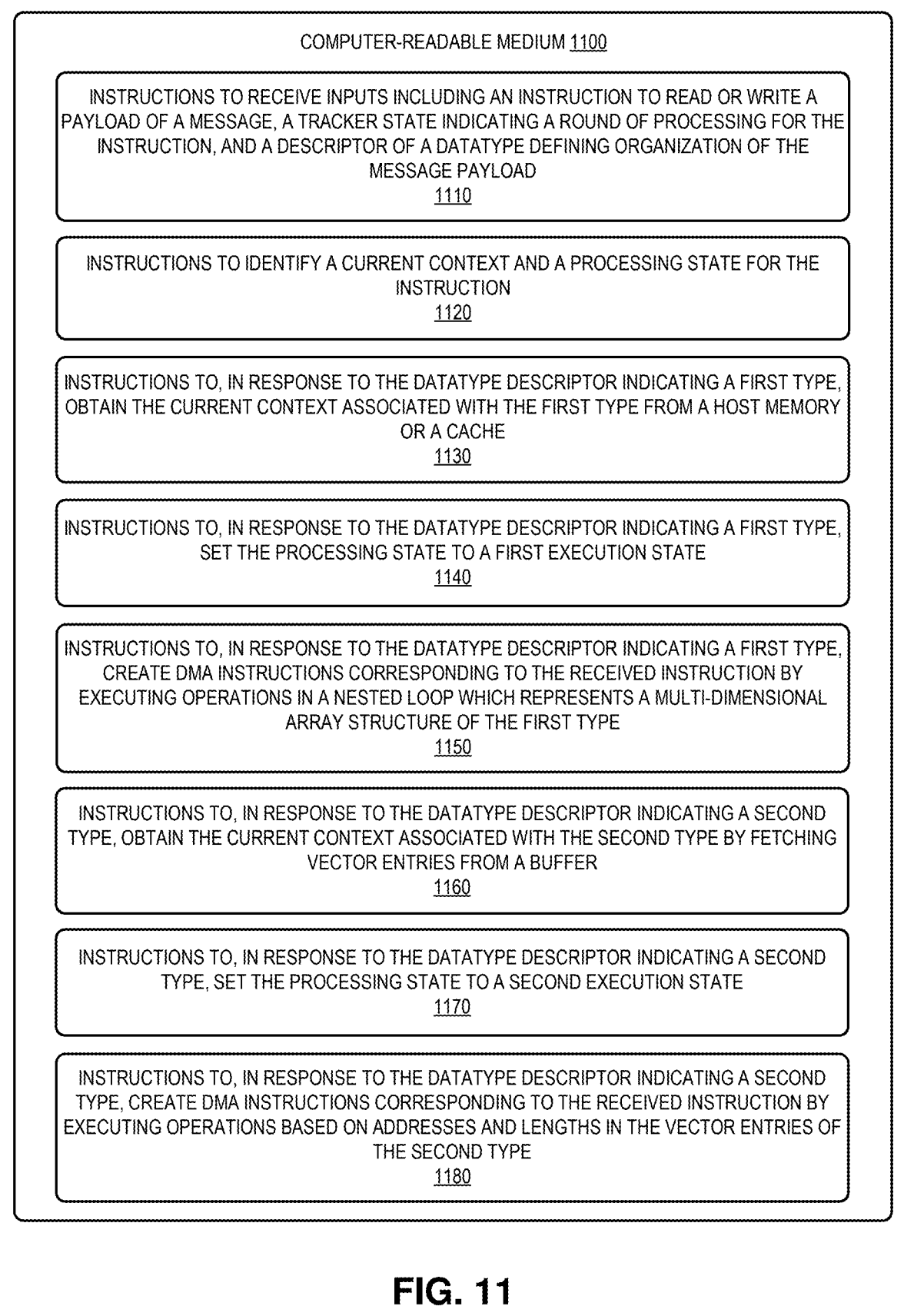

COMPUTER-READABLE MEDIUM 1100

INSTRUCTIONS TO RECEIVE INPUTS INCLUDING AN INSTRUCTION TO READ OR WRITE A PAYLOAD OF A MESSAGE, A TRACKER STATE INDICATING A ROUND OF PROCESSING FOR THE INSTRUCTION, AND A DESCRIPTOR OF A DATATYPE DEFINING ORGANIZATION OF THE MESSAGE PAYLOAD
1110

INSTRUCTIONS TO IDENTIFY A CURRENT CONTEXT AND A PROCESSING STATE FOR THE INSTRUCTION
1120

INSTRUCTIONS TO, IN RESPONSE TO THE DATATYPE DESCRIPTOR INDICATING A FIRST TYPE, OBTAIN THE CURRENT CONTEXT ASSOCIATED WITH THE FIRST TYPE FROM A HOST MEMORY OR A CACHE
1130

INSTRUCTIONS TO, IN RESPONSE TO THE DATATYPE DESCRIPTOR INDICATING A FIRST TYPE, SET THE PROCESSING STATE TO A FIRST EXECUTION STATE
1140

INSTRUCTIONS TO, IN RESPONSE TO THE DATATYPE DESCRIPTOR INDICATING A FIRST TYPE, CREATE DMA INSTRUCTIONS CORRESPONDING TO THE RECEIVED INSTRUCTION BY EXECUTING OPERATIONS IN A NESTED LOOP WHICH REPRESENTS A MULTI-DIMENSIONAL ARRAY STRUCTURE OF THE FIRST TYPE
1150

INSTRUCTIONS TO, IN RESPONSE TO THE DATATYPE DESCRIPTOR INDICATING A SECOND TYPE, OBTAIN THE CURRENT CONTEXT ASSOCIATED WITH THE SECOND TYPE BY FETCHING VECTOR ENTRIES FROM A BUFFER
1160

INSTRUCTIONS TO, IN RESPONSE TO THE DATATYPE DESCRIPTOR INDICATING A SECOND TYPE, SET THE PROCESSING STATE TO A SECOND EXECUTION STATE
1170

INSTRUCTIONS TO, IN RESPONSE TO THE DATATYPE DESCRIPTOR INDICATING A SECOND TYPE, CREATE DMA INSTRUCTIONS CORRESPONDING TO THE RECEIVED INSTRUCTION BY EXECUTING OPERATIONS BASED ON ADDRESSES AND LENGTHS IN THE VECTOR ENTRIES OF THE SECOND TYPE
1180

FIG. 11

UNIFIED INSTRUCTION PROCESSOR FOR DIRECT MEMORY ACCESS SCATTER/GATHER ENGINE

BACKGROUND

Field

A network interface card (NIC) can incorporate a direct memory access (DMA) engine for handling "gather" operations (e.g., reading pieces of a message payload from host memory and packing the pieces for network transmission) and a DMA engine for handling "scatter" operations (e.g., dividing up a message payload into pieces and writing the pieces to various locations in host memory). The NIC may use these DMA engines to accelerate the transfer of the message payload to and from host memory. In some instances, the message payload to be transmitted across or received from the network may not be contiguous in host memory. Users may use "datatype descriptors" to describe complex data layouts for sending and receiving data. However, separate processors in a DMA engine may be needed to process individual datatypes, which may result in additional hardware and require additional power in order to permit maximum bandwidth DMA operations.

BRIEF DESCRIPTION OF THE FIGURES

FIG. 3A depicts a table illustrating an exemplary Derived-Datatype (Derived-DT) descriptor, in accordance with an aspect of the present application.

FIG. 3B depicts an exemplary Derived-Datatype, in accordance with an aspect of the present application.

FIG. 3C depicts a table illustrating an exemplary Input/Output Vector-Datatype (IOVEC-DT) descriptor, in accordance with an aspect of the present application.

FIG. 5 presents pseudocode illustrating a method which facilitates a unified instruction processor for a DMA scatter/gather engine, including determining a current context and processing state for a Derived-Datatype, in accordance with an aspect of the present application.

FIGS. 8A and 8B present pseudocode illustrating a method which facilitates a unified instruction processor for a DMA scatter/gather engine, including determining a current context and processing state for an IOVEC-DT, in accordance with an aspect of the present application.

FIG. 11 illustrates a computer-readable medium which facilitates a unified instruction processor for a DMA scatter/gather engine, in accordance with an aspect of the present application.

In the figures, like reference numerals refer to the same figure elements.

DETAILED DESCRIPTION

Figure 1:
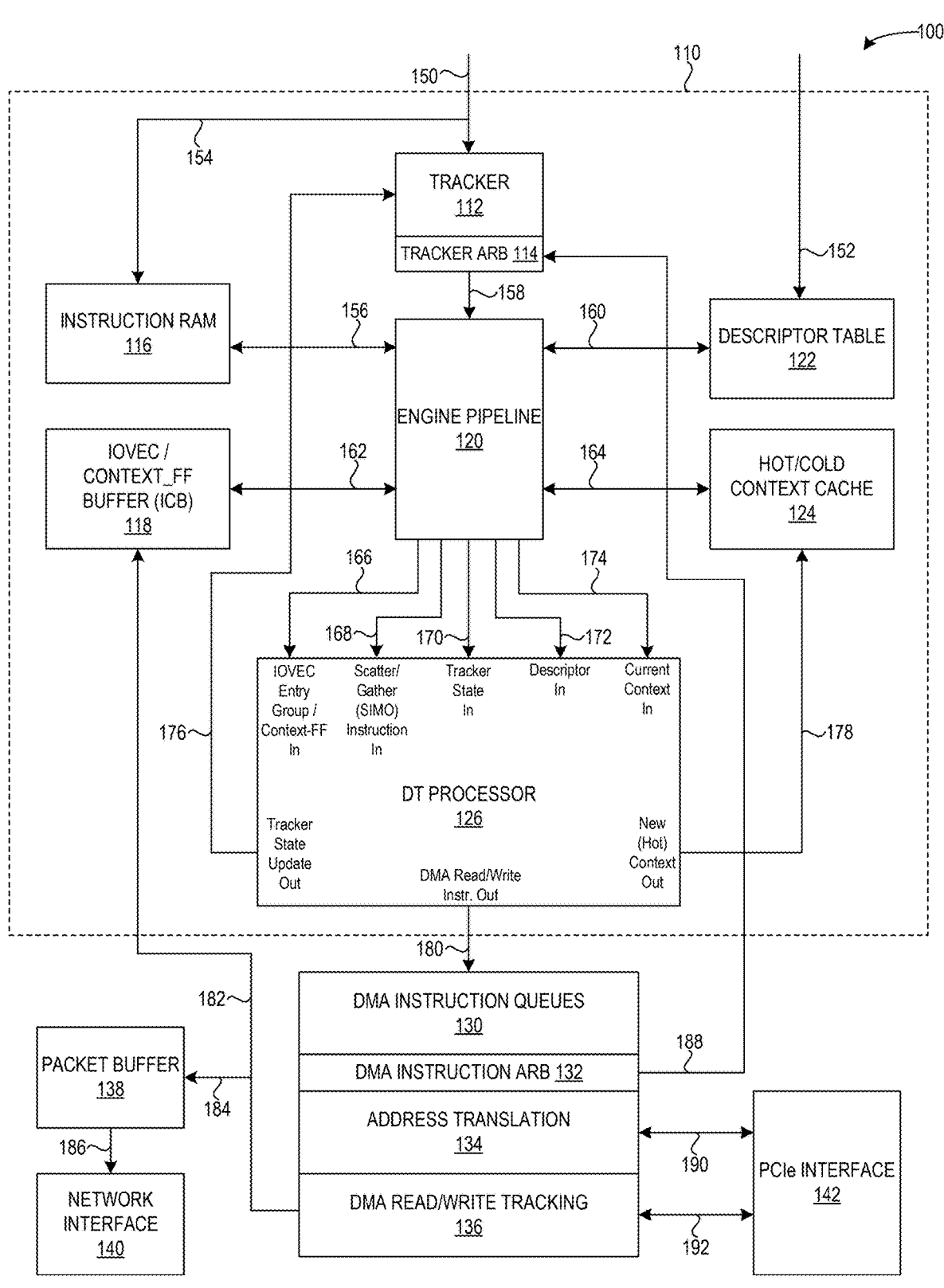
FIG. 1 illustrates a diagram of an architecture which facilitates a unified instruction processor for a direct memory access (DMA) scatter/gather engine, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

The described aspects provide a unified instruction processor in a direct memory access (DMA) scatter/gather engine of a network interface card (NIC). The DMA scatter/gather engine may be used to accelerate the transfer of "message" payload from and to a host memory. A "message" may be a piece of information transferred across the network as one or more packets (e.g., Ethernet frames with Transfer Control Protocol/Internet Protocol (TCP/IP) packets, a proprietary transport packet, etc.).

In some instances, the message payload to be transmitted across or received from the network may not be contiguous in host memory but may be organized in a manner described by a "datatype descriptor." Users may use datatype descriptors to describe complex data layouts for sending and receiving data. However, separate processors in a DMA engine in the NIC may be needed to process individual datatypes, which may result in additional hardware and require additional power in order to permit maximum bandwidth DMA operations.

The described aspects address the above-described limitations by providing a unified instruction processor (referred to as a "datatype processor" or "DTP") in the DMA scatter/gather engine. Each instance of the scatter/gather DMA engine may include a datatype processor. The DTP may include various execution resources to process the information provided by the DMA scatter/gather engine (e.g., as inputs to DTP 126 of FIG. 1 and DTP 200 of FIG. 2) and to generate the series of basic DMA instructions that describe individual reads from or writes to host memory (e.g., as outputs from DTP 126 of FIG. 1 and DTP 200 of FIG. 2).

In the case of the gather scenario, the gather DMA engine may fetch all the ("small") pieces of the payload and pack them together for transmission across the network (as one or more packets). This may improve performance as software may no longer be required to copy and pack all the data into a contiguous region of host memory for consumption by the NIC. In the case of the scatter scenario, the scatter DMA engine may receive the message payload (packed into one or more network packets), divide the message payload up, and write the pieces to various locations in host memory. This may also improve performance as software may no longer need to unpack and copy all the data which was written into a contiguous region of host memory when received from the network.

The DTP can support processing of two specific datatypes. The first datatype is a "Derived Datatype" ("Derived-DT"), which can represent a multi-dimensional array structure (e.g., defined by one or more nested loops) including the number of elements in each dimension, the size of an element to be transferred, and the stride in each dimension. An exemplary Derived-DT descriptor is provided below in relation to FIG. 3A. The second datatype is an "Input/Output Vector Datatype" ("IOVEC-DT"), which can be represented by an array of address/length pairs, each describing a portion of the message payload. The DTP may receive as input information (including an instruction and a datatype descriptor) from various other components in the NIC, process the instruction based on the state and context for the datatype, and output multiple DMA instructions. An exemplary IOVEC-DT descriptor is provided below in relation to FIG. 3C. The DTP may also perform byte-masking on data elements with non-contiguous groups of bytes, as described below in relation to FIGS. 2 and 10.

Thus, the described aspects provide a unified processor in a DMA scatter/gather engine which can support processing of two distinct datatypes: the Derived-DT (as described below in relation to FIGS. 2, 4B, 6, and 7); and the IOVEC-DT (as described below in relation to FIGS. 2, 4C, and 8). An architecture of a DMA scatter/gather engine and a DTP diagram are provided below in relation to, respectively, FIGS. 1 and 2. By using datatype descriptors to describe complex data layouts for sending and receiving data, and by providing a unified processor which can process at least two datatypes (i.e., Derived-DT and IOVEC-DT), the described aspects eliminate the need for separate processors to process individual datatypes, which may result in an improvement in hardware needs and power consumption.

Exemplary High-Level Architecture

FIG. 1 illustrates a diagram 100 of an architecture which facilitates a unified instruction processor for a direct memory access (DMA) scatter/gather engine, in accordance with an aspect of the present application. Diagram 100 includes a DMA scatter/gather engine (also referred to as the "engine") 110 which interacts with various components external to the engine. Engine 110 may be part of circuitry or logic in a NIC which can perform the operations described herein. Engine 110 may include: a tracker 112 and a tracker arbitrator ("Arb") 114 which handles scheduling for the processing of incoming instructions to the scatter/gather engine; an instruction random access memory (RAM) 116 which stores information associated with an incoming instruction; an IOVEC/context-FastForward ("context-FF") buffer 118 (also referred to the "ICB" or "buffer") which stores data fetched from host memory; a descriptor table 122 with entries which each define a scatter/gather operation; a hot/cold context cache 124 which caches contexts based on an associated access or storage time; a DMA scatter/gather engine pipeline 120 (also referred to as the "engine pipeline" or "data pipe") which gathers information from various units or components in the engine; and a datatype processor (DTP) 126 which receives inputs (e.g., from engine pipeline 120) and performs the methods described herein. Descriptor table 122 may be a software-programmable table local to a specific DMA scatter/gather engine or may be shared among multiple engines. Prior to initiating a scatter/gather operation, software must program a datatype descriptor (e.g., Derived-DT or IOVEC-DT) in descriptor table 122, which defines the organization of the message payload in host memory.

Descriptor table 122 can include both non-byte-mask descriptor storage and byte-mask descriptor storage. The byte-mask portion of a descriptor can refer to a value with a number of bits that can be used as a byte-mask on data of up to a predetermined number of bytes. For example, during a compaction process, each bit in an X-bit byte-mask can correspond to a byte in an X-byte chunk or block of data. The non-byte-mask portion of a descriptor can include other information, e.g., loop counts and strides (for a Derived-DT), a pointer to an IOVEC in host memory (for an IOVEC-DT), etc., which is created by a user and stored in descriptor table 122 for subsequent use or retrieval by the DMA scatter/gather engine. Byte-mask processing is described in detail below in relation to FIG. 10.

During operation, engine 110 can receive an instruction 150, e.g., a single input multiple output (SIMO) instruction. The SIMO instruction may include information defining a scatter/gather operation at a high level, e.g.: a base host memory address; an overall payload length; and a reference to an entry in descriptor table 122. For each SIMO instruction input into engine 110, engine 110 may ultimately produce multiple instruction outputs, which each describes a single DMA read or write. Engine 110 may also produce DMA read instructions to fetch data from host memory on its own behalf, e.g., fetching IOVEC-entry groups or Derived-DT context-FF information, as described below in relation to elements 210 and 230 of FIG. 2.

Engine 110 can store the information associated with the SIMO instruction in instruction RAM 116 (via a communication 154). Upon receiving instruction 150, tracker 112 can create and store a tracker entry. Tracker 112 may track received instructions, and each entry (e.g., of 256 entries) of the tracker can manage the overall scatter/gather operation corresponding to the SIMO instruction. Tracker Arb 114 may schedule the instruction for processing by managing the tracker entries and a credit-based flow control (e.g., based on a communication 188) associated with output queues (not shown) of the engine, which may allow the engine to manage many concurrent gather/scatter operations in a time-sliced manner.

When the instruction is to be processed based on the scheduling (i.e., when a particular tracker entry wins arbitration) via a communication 158, engine pipeline 120 may obtain the instruction from instruction RAM 116 (via a communication 156) as well as the contents of the tracker entry (via communication 158). Based on descriptor information provided in the instruction, engine pipeline 120 may obtain the descriptor from descriptor table 122. Engine pipeline 120 may also obtain data (e.g., IOVEC entries or context-FF data), if available, from ICB 118 (via a communication 162). Engine pipeline 120 may also obtain the current context, if available, from hot/cold context cache 124 (via a communication 164).

A round of processing may begin with a tracker entry being selected (i.e., winning arbitration) and engine pipeline 120 obtaining up to five inputs from other components in engine 110. Engine pipeline 120 may send the five inputs to DTP 126 (via communications 166, 168, 170, 172, and 174).

DTP 126 may receive the five inputs and may accept information from an applicable input queue or queues, e.g., if DTP 126 is idle or when DTP 126 completes any in-progress execution. The five inputs to DTP 126 may include: an IOVEC entry group/context-FF, if available (via communication 166); the SIMO instruction (via communication 168); the tracker state (via communication 170); the descriptor (via communication 172); and the current context, if available (via communication 174). DTP 126 may process the information received in the five inputs over one or more cycles, depending on, e.g., the availability of output queue credit and the possibility of performing additional work. After processing the inputs, DTP 126 may generate and send as outputs: a tracker state update to tracker 112 (via a communication 176); the new (hot) context to hot/cold context cache 124 (via a communication 178); and DMA read/write instructions to be processed and transmitted by components external to engine 110 (via a communication 180). A detailed overview of DTP 126 is provided below in relation to FIG. 2.

DMA read/write instructions may be sent via communication 180 to a PCIe interface 142 or a network interface 140, by passing through processing in various units. DMA instruction queues 130 and a DMA instruction arbitrator ("Arb") 132 may handle scheduling for the sending of the DMA instructions. An address translation unit 134 may handle translating logical to physical addresses and may transmit corresponding information to PCIe interface 142 (via a communication 190). A DMA read/write tracking unit 136 may track the DMA instructions being processed and send relevant information to: ICB 118 (via a communication 182); PCIe interface 142 (via a communication 192); and packet buffer 138 (via a communication 184). Data stored in packet buffer 138 may be transmitted to network interface 140 (via a communication 186).

Figure 2:
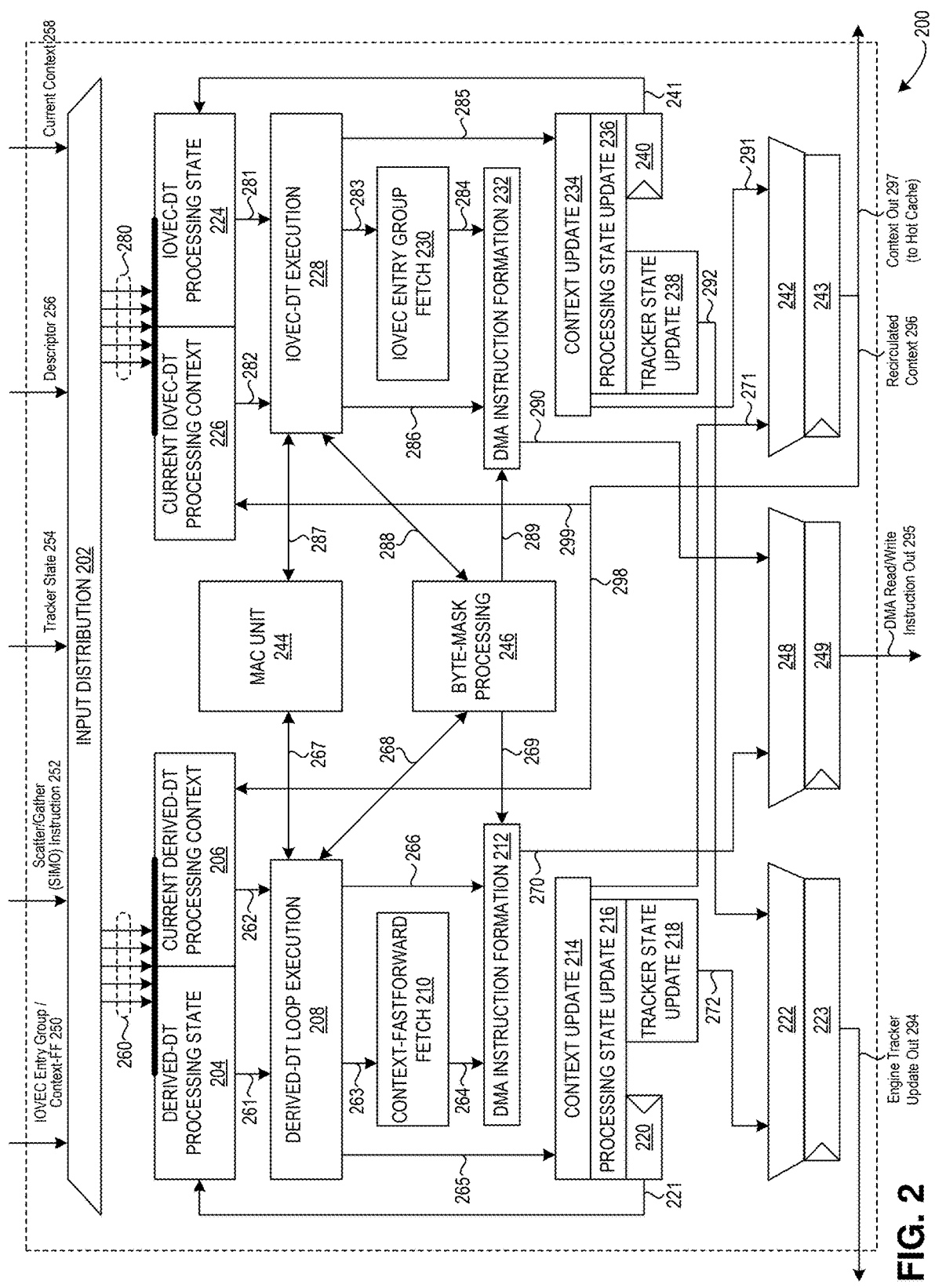
FIG. 2 illustrates a diagram of a datatype processor (DTP), in accordance with an aspect of the present application.

FIG. 2 illustrates a diagram of a datatype processor (DTP) 200, in accordance with an aspect of the present application. DTP 200 may be a processing resource or a part of circuitry or logic in an engine of a NIC which can perform the operations described herein. DTP 200 may include an input distribution unit 202, which may receive and distribute five inputs from various components of a DMA scatter/gather engine, including: an IOVEC entry group/context-FF 250; a SIMO instruction 252; a tracker state 254; a descriptor 256; and a current context 258. Based on descriptor 256, input distribution unit 202 may determine whether to proceed as depicted by the distribution of communications 260 on the left side (if the datatype indicates a derived-DT) or as depicted by the distribution of communications 280 on the right side (if the datatype indicates an IOVEC-DT). Resources in DTP 200 for both Derived-DT processing (i.e., the left side) and IOVEC-DT processing (i.e., the right side) may use a shared multiply-accumulate (MAC) unit 244 and a shared byte-mask processing unit 246, as described below.

If the descriptor indicates the Derived-DT, DTP 200 may use the inputs received via communications 260 to determine the processing state and current context. A Derived-DT processing state unit 204 and a current Derived-DT processing context unit 206 may perform operations to identify the processing state and current context, as described below in relation to FIGS. 4B, 5, 6, and 7.

Derived-DT processing state unit 204 and current Derived-DT processing context unit 206 may determine that if the processing is not in the first cycle of the current processing round, this may indicate that the context has been created in a previous cycle and the corresponding context-FF entry exists in the ICB. This may imply that a prior round of processing has already occurred to place that information in the ICB entry. The current context may include "basic context" (i.e., context-FF 250 from the ICB) and "extended context" (i.e., current context 258 from the context cache). The basic context may include loop counter values and the number of bytes transferred, while the extended context may include the address offset and adjustments to stride values. In this scenario, because both Context-FF 250 and current context 258 have been included as inputs to DTP 200 (or recirculated from a previous processing cycle as recirculated context 296 via a communication 298), units 204 and 206 may determine and provide the processing state and current context to Derived-DT loop execution unit 208 (via communications 261 and 262).

Derived-DT loop execution unit 208 may perform the loop execution, and DMA instruction formation unit 212 may generate the corresponding DMA instructions based on the results of the loop execution (as transmitted via a communication 266). In some aspects, descriptor 256 may indicate that byte-masking is to be performed (e.g., in an element 326 for "do_byte_masking" in the exemplary Derived-DT descriptor of FIG. 3A). A byte-mask may be included as input with descriptor 256. Derived-DT loop execution unit 208 may perform the loop execution by communicating with byte-mask processing unit 246 to obtain the valid bytes of the data (via a communication 268). Byte-masking is described below in relation to FIG. 10. Byte-mask processing unit 246 may send information associated with the valid bytes of data (via a communication 269) to DMA instruction formation unit 212, which may use that information to form the DMA instruction. Subsequent to performing the loop execution (or as many rounds as possible), context update unit 214 may update the context, e.g., by updating loop counter values and the number of bytes transferred, based on information transmitted via a communication 265.

Context update unit 214 may also send the updated context to a multiplexer ("mux") 242 (via a communication 271). Mux 242 may select the updated context, and either: send it back as recirculated context 296 (via a communication 298) to current Derived-DT processing context unit 206 for subsequent use; or transmit it as a context out 297 to the hot context cache (e.g., cache 124 of FIG. 1). Processing state update unit 216 may update the processing state, which may affect execution of various operations by DTP 200. A state diagram of processing states for Derived-DT processing is described below in relation to states 920, 922, 924, 926, and 928 of FIG. 9. Processing state update unit 216 may store the state in a register 220, and the stored state may be sent to Derived-DT processing state unit 204 (via a communication 221) for subsequent use. In addition, a tracker state update unit 218 may update the tracker state and transmit the updated tracker state to mux 222 (via a communication 272). Mux 222 may select the updated tracker state and transmit an engine tracker update out 294 to the tracker (e.g., tracker 112 of FIG. 1).

Derived-DT processing state unit 204 and current Derived-DT processing context unit 206 may determine that if the packet being processed is the first packet of the message (e.g., based on tracker state 254) and if the processing is in the first cycle of the current processing round, DTP 200 may infer the current context. That is, Derived-DT loop execution unit 208 may determine to infer the context (based on communications 261 and 262) by initializing the basic context with all zeroes and by calculating the extended context. Derived-DT loop execution unit 208 may communicate with MAC unit 244 in order to obtain the extended context (via a communication 267). MAC unit 244 may calculate the address offset ("addr offset"), a stride adjustment in the y-dimension ("stridey_adj"), and a stride adjustment in the z-dimension ("stridez_adj"). The address offset may indicate the offset to the base address from which DTP 200 is to currently read or write the next data element. In this instance, the address offset is zero because the loop counters are zero, so the MAC unit does not calculate the address offset. The stride adjustments may be used to track the progress through the rows and columns of a matrix representing the multi-dimensional array structure of the Derived-DT.

Upon inferring the current context, Derived-DT loop execution unit 208 may perform the loop execution, and the same operations as described above may occur via the same communications to other units of DTP 200 (i.e., the operations described above in relation to units 244, 246, 212, 214, 216, and 218).

Derived-DT processing state unit 204 and current Derived-DT processing context unit 206 may determine whether a cached context was found during the traversal of the data pipe (e.g., engine pipeline 120 of FIG. 1). If the cached context was not found, the operation continues as described below. If the cached context was found and the context type indicates an IOVEC-DT, Derived-DT loop execution unit 208 may identify the current context by obtaining the basic context from the context-FF entry in the ICB (i.e., input as context-FF 250) and by calculating the extended context (e.g., by communicating with MAC unit 244 as described above). In this scenario, the address offset returned from MAC unit 244 may not be zero because this scenario is reached only if the packet is not the first packet and the processing is not in the first cycle of the current processing round. If the cached context was found and the context type indicates a Derived-DT, Derived-DT loop execution unit 208 may obtain the current (basic and extended) context from the cache (i.e., input as current context 258).

Upon identifying the current context, Derived-DT loop execution unit 208 may perform the loop execution, and the same operations as described above may occur via the same communications to other units of the DTP 200 (i.e., the operations described above in relation to units 244, 246, 212, 214, 216, and 218).

Derived-DT processing state unit 204 and current Derived-DT processing context unit 206 may determine that the message being processed corresponds to a GET response packet. An "inbound" or DMA scatter engine may receive the GET response associated with a previously transmitted GET request. When the GET request is processed, software has already programmed the descriptor table with the descriptor to be used for the subsequent scatter operation to be performed by the DMA scatter engine for the GET response. A "Get-response-context-generating engine" (not covered herein) may use the descriptor to generate and store starting context (context-FF) for each GET response packet as the corresponding GET request packet is issued. As a result (referring now to the "inbound" or DMA scatter engine processing a GET response), context-FF 250 may be input to DTP 200, and a bit ("DT_offset.type") may indicate that this context-FF 250 was not previously placed in the ICB based on a fetch from host memory, but instead has arrived at DTP 200 associated with a GET response packet. As a result, units 204 and 206 may copy this basic context from "DT_offset.value," instead of retrieving data from an ICB entry. Derived-DT loop execution unit 208 may identify the current context based on the basic context and by calculating the extended context (e.g., by communicating with MAC unit 244 as described herein).

Upon identifying the current context, Derived-DT loop execution unit 208 may perform the loop execution, and the same operations as described above may occur via the same communications to other units of the DTP 200 (i.e., the operations described above in relation to units 244, 246, 212, 214, 216, and 218).

Derived-DT processing state unit 204 and current Derived-DT processing context unit 206 may determine that: (a) the processing is in the first cycle; (b) the packet is not the first packet and first round of processing; (c) the cached context is not found during the data pipe traversal; or (d) the message does not correspond to a GET response packet (corresponding to, respectively, decisions 412, 416, 420, and 428 of FIG. 4B). In this scenario, Derived-DT loop execution unit 208 may not have sufficient information to begin execution of the loop. Derived-DT loop execution unit 208 may create an IOVEC-formatted context, allocate an entry in the ICB (listed in the IOVEC-formatted context), and notify context-FF fetch unit 210 (via a communication 263) to fetch the appropriate context from host memory. The context may be precomputed and stored in an array in host memory for each packet. Context-FF fetch unit 210 may send information regarding the information to be requested to DMA instruction formation unit 212 (via a communication 264). DMA instruction formation unit 212 may generate and send the DMA instruction(s) to read the context information from host memory, e.g., via a communication 270 to mux 248, which may be sent out as DMA read/write instruction 295. The DMA scatter/gather engine may complete the current round of processing by writing the IOVEC-formatted context (listing the allocated ICB entry) to the cache to be fetched in a subsequent round of processing, after the requested context has been returned from host memory.

If the descriptor indicates the IOVEC-DT, DTP 200 may use the inputs received via communications 260 to determine the processing state and current context. An IOVEC-DT processing state unit 224 and a current IOVEC-DT processing context unit 226 may perform operations to identify the processing state and current context, as described below in relation to FIGS. 4C, 7, 8A, and 8B.

Current IOVEC-DT processing context unit 226 may determine that if the processing is not in the first cycle of the current processing round, this may indicate that the context has been created in a previous cycle. In this scenario, because the current context has been recirculated from a previous processing cycle (as recirculated context 296 via a communication 299), unit 226 may determine and provide the current context to IOVEC-DT execution unit 228 (via a communication 282). If an ICB entry is listed in the recirculated context and recorded as valid (populated with an IOVEC-entry-group read from host memory in a previous round of processing), it has been read by the engine pipeline and presented to the DTP at the start of this round of processing.

Current IOVEC-DT processing context unit 226 may determine that if the packet being processed is the first packet of the message (e.g., based on tracker state 254) and if the processing is in the first cycle of the current processing round, IOVEC-DT execution unit 228 may initialize the IOVEC-DT context with all zeroes and set the current context to the IOVEC type (based on communication 282).

Current IOVEC-DT processing context unit 226 may determine if a cached context was found during the data pipe traversal (e.g., via engine pipeline 120 of FIG. 1). If the cached context was found, unit 226 may obtain the current IOVEC-DT context from the cache (i.e., input as current context 258). If an ICB entry is listed in the cached context and recorded as valid (populated with an IOVEC-entry-group read from host memory in a previous round of processing), it has been read by the engine pipeline and presented to the DTP along with the cached context.

If the cached context was not found during the data pipe traversal, IOVEC-DT execution unit 228 may initialize the IOVEC-DT context with all zeroes and set the current context to the IOVEC type (based on communication 282).

IOVEC-DT processing state unit 224 may determine the IOVEC-DT processing state based on whether the context is found during the data pipe traversal or whether the processing is in the first cycle of the current processing round. Unit 224 may identify the IOVEC processing state further based on, e.g.: whether the current context is included as an input to the processing resource; whether the payload transfer is complete; whether the current round of processing comprises a null round of processing; whether a new "head-of-context-list" entry in the buffer (i.e., the entry in the buffer referenced in the first list buffer entry in context) has been read; whether the IOVEC entries have been fetched from host memory; whether the head-of-context-list entry in the buffer is valid; whether the message payload comprises a GET response packet associated with a previous GET request handled by the processing resource; whether a value indicates to no longer fetch any IOVEC entries; whether one or more buffer entries are available for allocation; whether the message payload associated with the instruction is eligible for a payload transfer or an IOVEC entry fetch; or whether processing of the instruction is in a first cycle of a current round of processing. Identifying and setting the IOVEC-DT processing state is described below in relation to sections 820, 822, and 824 of pseudocode 810 of FIG. 8B. The above conditions are provided for illustrative purposes and are non-limiting. Other conditions may be used by IOVEC-DT processing state unit 224 to identify the processing state.

Based on one or more of these conditions for identifying the IOVEC-DT processing state, IOVEC-DT execution unit 228 may obtain the processing state from unit 224 (via a communication 281) and, along with the context identified by unit 226 (via communication 282), IOVEC-DT execution unit 228 may determine that the IOVEC context is available, the ICB entry read has completed, and the IOVEC entries are available for processing.

IOVEC-DT execution unit 228 may process the IOVEC entries or issue reads to fetch additional IOVEC entries, which may include communicating with MAC unit 244 and byte-mask processing unit 246. For example, IOVEC-DT execution unit 228 may communicate with MAC unit 244 (via a communication 287) in order to obtain the value "dtseqnum_epnk," as described below in relation to FIG. 7. In addition, descriptor 256 may indicate that byte-masking is to be performed (e.g., in an element 380 for "do_byte_masking" in the exemplary IOVEC-DT descriptor of FIG. 3C). A byte-mask may be included as input with descriptor 256. IOVEC-DT execution unit 228 may process the IOVEC entries by communicating with byte-mask processing unit 246 to obtain the valid bytes of the data (via a communication 288). Byte-masking is described below in relation to FIG. 10. DMA instruction formation unit 232 may generate the corresponding DMA instructions based on the processed IOVEC entries (as transmitted via a communication 286). In some aspects, byte-mask processing unit 246 may send information associated with the valid bytes of data (via a communication 289) to DMA instruction formation unit 212, which may use that information to form the DMA instruction. Subsequent to processing the IOVEC entries, context update unit 234 may update the context, e.g., by updating a pointer to the IOVEC entry and a byte count (based on information transmitted via a communication 285).

Context update unit 234 may also send the updated context to mux 242 (via a communication 291). Mux 242 may select the updated context, and either: send it back as recirculated context 296 (via a communication 299) to current IOVEC-DT processing context unit 226 for subsequent use; or transmit it as a context out 297 to the hot context cache (e.g., cache 124 of FIG. 1). Processing state update unit 236 may update the processing state, which may affect execution of various operations by DTP 200. A state diagram of processing states for IOVEC-DT processing is described below in relation to states 930, 932, 934, 936, and 938 of FIG. 9. Processing state update unit 236 may store the state in a register 240, and the stored state may be sent to IOVEC-DT processing state unit 224 (via a communication 241) for subsequent use. In addition, a tracker state update unit 238 may update the tracker state and transmit the updated tracker state to mux 222 (via a communication 292). Mux 222 may select the updated tracker state and transmit an engine tracker update out 294 to the tracker (e.g., tracker 112 of FIG. 1).

Based on the obtained context and processing state (via communications 281 and 282), IOVEC-DT execution unit 228 may determine that the IOVEC entries need to be fetched from host memory. IOVEC-DT execution unit 228 may create an IOVEC-formatted context, allocate an entry in the ICB, and notify IOVEC entry group fetch unit 230 (via a communication 283) to fetch the appropriate IOVEC entries from host memory. IOVEC entry group fetch unit 230 may send information regarding the information to be requested to DMA instruction formation unit 232 (via a communication 284). DMA instruction formation unit 232 may generate and send the DMA instruction(s) to read the IOVEC-entry-group from host memory, e.g., via a communication 290 to mux 248, which may be sent out as DMA read/write instruction 295. The IOVEC-DT execution unit 228 may execute one or more cycles of IOVEC-entry-group fetches, allocating another entry in the ICB in each cycle, and adding it to the list of ICB entries in context. The DMA scatter/gather engine may complete the round of processing by writing the IOVEC-formatted context (listing the allocated ICB entries) to the cache to be fetched in a subsequent cycle, after one or more of the fetched IOVEC-entry-groups have returned from host memory.

FIG. 3A depicts a table 300 illustrating an exemplary Derived-DT descriptor, in accordance with an aspect of the present application. Table 300 includes entries 310-338 indicating the names of elements (302) of the Derived-DT descriptor along with a respective description (304) for each element. For example, entry 330 indicates that if the element "dsc_type" is set to a value of "1," this may represent a Derived-DT formatted descriptor. As another example, an entry 326 for the element "do_byte_masking" indicates whether byte-masking is to be performed. If this element is set to a value of "1" (or another value that indicates that byte-masking is to be performed), the descriptor table (e.g., descriptor table 122 in FIG. 1) may store a 256-bit byte-mask in parallel with the descriptor. Table 300 is reproduced below:

| ELEMENT 302 | DESCRIPTION 304 |
|---|---|
| 310{ stridez [31:0] | Stride value in z dimension |
| 312{ stridey [31:0] | Stride value in y dimension |
| 314{ stridex [31:0] | Stride value in x dimension |
| 316{ elementsz [15:0] | Total number of elements in z dimension |
| 318{ elementsy [15:0] | Total number of elements in y dimension |
| 320{ elementsx [15:0] | Total number of elements in x dimension |
| 322{ vb_last [7:0] | Number of valid bytes in the last element in the x dimension (may be different than vld_bytes) |
| 324{ vld_bytes [7:0] | Number of valid bytes in a data element when a byte mask is used |
| 326{ do_byte_masking | Indicates when byte-masking should be performed |
| 328{ last_partial | Indicates when the last element in the x dimension is a partial element |
| 330{ dsc_type | Set to 1, indicating Derived-DT formatted Descriptor |
| 332{ block_size [8:0] | Size of data element (max 256) |
| 334{ bs_last [7:0] | Size of last (partial) data element in x dimension (applicable if last_partial = 1) |
| 336{ length [39:0] | Total byte length of payload to be transferred (possibly in multiple packets) |
| 338{ address [63:0] | Base address of Context-FF array in host memory |

FIG. 3B depicts an exemplary Derived-DT 340, in accordance with an aspect of the present application. A section 342 may provide definitions for Derived-DT 340, including: a data structure named "element" with four values as indicated; and a data structure named "AoE" as an array of "elements," including a number of elements in three dimensions (e.g., x=200, y=100, and x=80), indicating that three dimensions of strides are supported. For each element in the array, the element size may be up to, e.g., 256 bytes, which may be consistent with the size of common data structures in current applications. Other smaller or larger element sizes may be used. Each of sections 344, 346 and 348 indicates that for a particular "face" (e.g., across two of the three dimensions), only certain subcomponents of the elements are to be selected. A byte-mask for each element may be supported to select individual bytes to send. In Derived-DT 340, the byte-mask may select the "b" and "d" subcomponents of the element. Exemplary derived-DT 340 is reproduced below:

```
struct element {
    int a;
    float b;
    uint8_t c;
    double d;
};
struct element AoE [80] [100] [200];
int x, y, z;
```
342

```
//Send face yx
for(y=0; y < 100; y++)
    for(x=0; x< 200; x++) {
        send(AoE[0][y][x].b);
        send(AoE[0][y][x].d);
    }
```
344

```
//Send face zy
for(z=0; z< 80; z++)
    for(y=0; y < 100; y++) {
        send(AoE[z][y][0].b);
        send(AoE[z][y][0].d);
    }
```
346

-continued

```
//Send face zx
for(z=0; z< 80; z++)
    for(x=0; x< 200; x++) {
        send(AoE[z][0][x].b);
        send(AoE[z][0][x].d);
    }
```
348

FIG. 3C depicts a table 360 illustrating an exemplary IOVEC-DT descriptor, in accordance with an aspect of the present application. Table 360 includes entries 370-390 indicating the names of elements (362) of the IOVEC-DT descriptor along with a respective description (364) for each element. For example, entry 384 indicates that if the element "dsc_type" is set to a value of "0," this may represent an IOVEC-DT formatted descriptor. Furthermore, an entry 380 for the element "do_byte_masking" indicates whether byte-masking is to be performed. If this element is set to a value of "1" (or another value that indicates that byte-masking is to be performed), the descriptor table (e.g., descriptor table 122 in FIG. 1) may store a 256-bit byte-mask in parallel with the descriptor.

An IOVEC-DT may include two general categories: a "storage" IOVEC, where each IOVEC entry other than the first or last entry has a standard and relatively large length, e.g., 4 kilobytes (KB); and a "general" IOVEC, where the lengths are generally smaller and random. In a specific case of the general IOVEC, the entries may all have the same length value, wherein each entry may correspond to a common-size element of a data structure and each element may itself be a structure which can be described by a byte-mask. Table 360 is reproduced below:

| | ELEMENT 362 | DESCRIPTION 364 |
|---|---|---|
| 370 | { nk_enc [2:0] | Defines the value of nk with respect to ent_per_nk:<br>2 = 4k, 5 = 32k, 6 = 64k (other values may not be supported) |
| 372 | { ent_per_nk [15:0] | Number of IOVEC entries addressing nk bytes of payload |
| 374 | { alignment [15:0] | Offset of the alignment point into the entry. Applicable when ent_per_nk == 1, indicating a storage-type IOVEC, where all IOVEC entries have a common length value, except possibly the first and last.<br>The alignment value will be equal to the length value in the first IOVEC entry |
| 376 | { entries [31:0] | Total number of entries in the IOVEC |
| 378 | { vld_bytes [7:0] | Number of valid bytes in a data element when a byte mask is used |

-continued

| | ELEMENT 362 | DESCRIPTION 364 |
|---|---|---|
| 380 | { do_byte_masking | Indicates when byte-masking should be performed |
| 382 | { relative | Indicates if the IOVEC uses relative address (1) or absolute addressing (0) |
| 384 | { dsc_type | Set to 0, indicating IOVEC-DT formatted Descriptor |
| 386 | { block_size [8:0] | Size of data element (max 256) |
| 388 | { length [39:0] | Total byte length of payload to be transferred (possibly in multiple packets) |
| 390 | { address [63:0] | Base address of IOVEC in host memory |

Figure 4A:
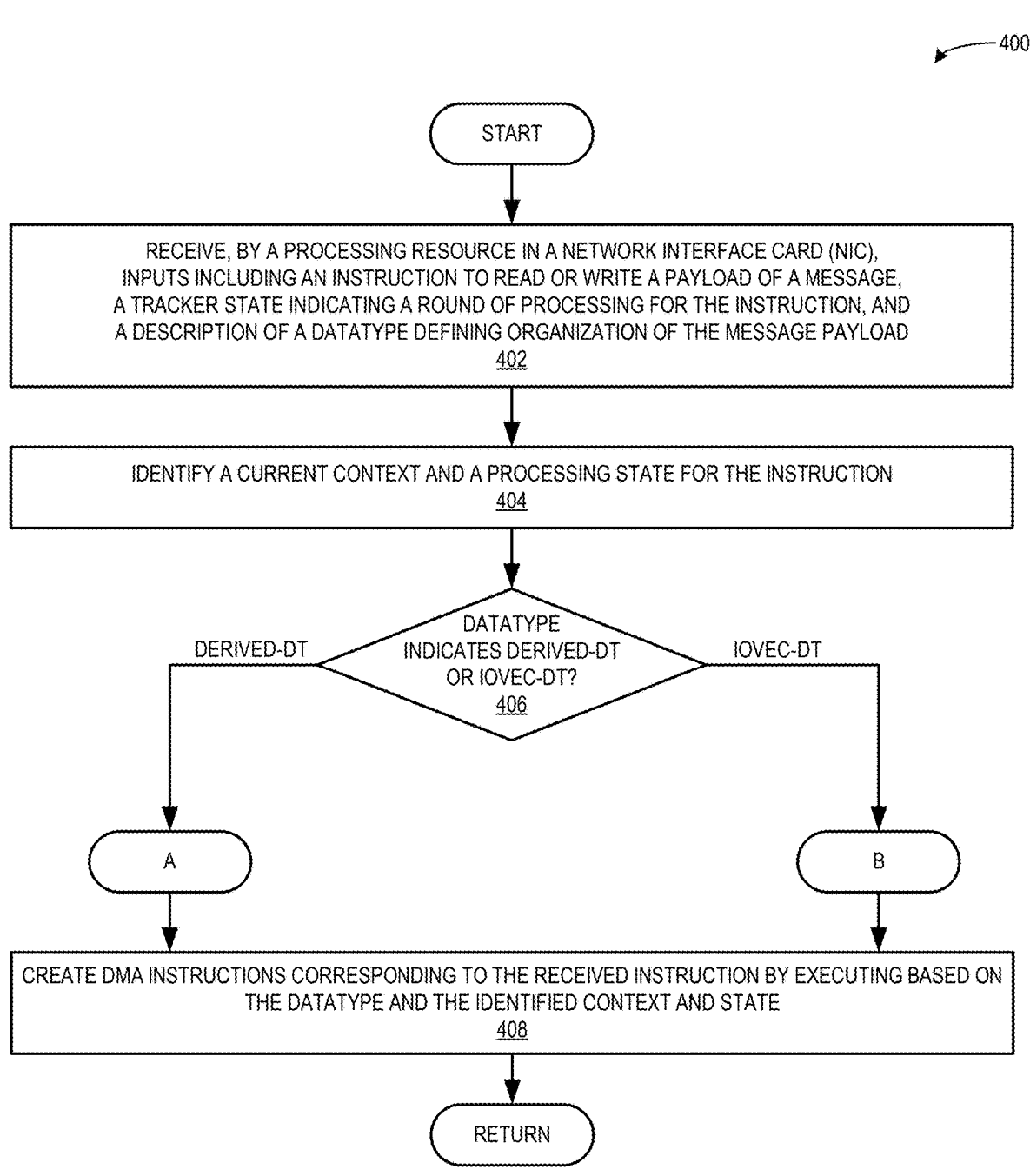
FIG. 4A presents a flowchart illustrating a method which facilitates a unified instruction processor for a DMA scatter/gather engine, in accordance with an aspect of the present application.

FIG. 4A presents a flowchart 400 illustrating a method which facilitates a unified instruction processor for a DMA scatter/gather engine, in accordance with an aspect of the present application. The system receives, by a processing resource in a network interface card (NIC), inputs including an instruction to read or write a payload of a message, a tracker state indicating a round of processing for the instruction, and a descriptor of a datatype defining organization of the message payload (operation 402). For example, as depicted in FIG. 2, DTP 200 can receive SIMO 252, tracker state 254, and descriptor 256.

The system identifies a current context and a processing state for the instruction (operation 404), as described above in relation to units 204, 206, 224, and 226 of FIG. 2. In response to the datatype descriptor indicating the Derived-DT ("first type"), as in entry 330 of FIG. 3A, the operation continues at Label A of FIG. 4B. In response to the datatype descriptor indicating the IOVEC-DT ("second type"), as in entry 384 of FIG. 3C, the operation continues at Label B of FIG. 4C. Subsequent to identifying the current context and processing state in the operations at each of Labels A and B in FIGS. 4B and 4C, the system executes based on the datatype and the identified processing state, as described above in relation to the units and operations for the Derived-DT (e.g., left side of FIG. 2) and the units and operations for the IOVEC-DT (e.g., right side of FIG. 2). Example Derived-DT and IOVEC-DT processing states are described below in relation to FIG. 9 and further noted in the pseudo-code of FIGS. 5, 8A, and 8B.

Figure 4B:
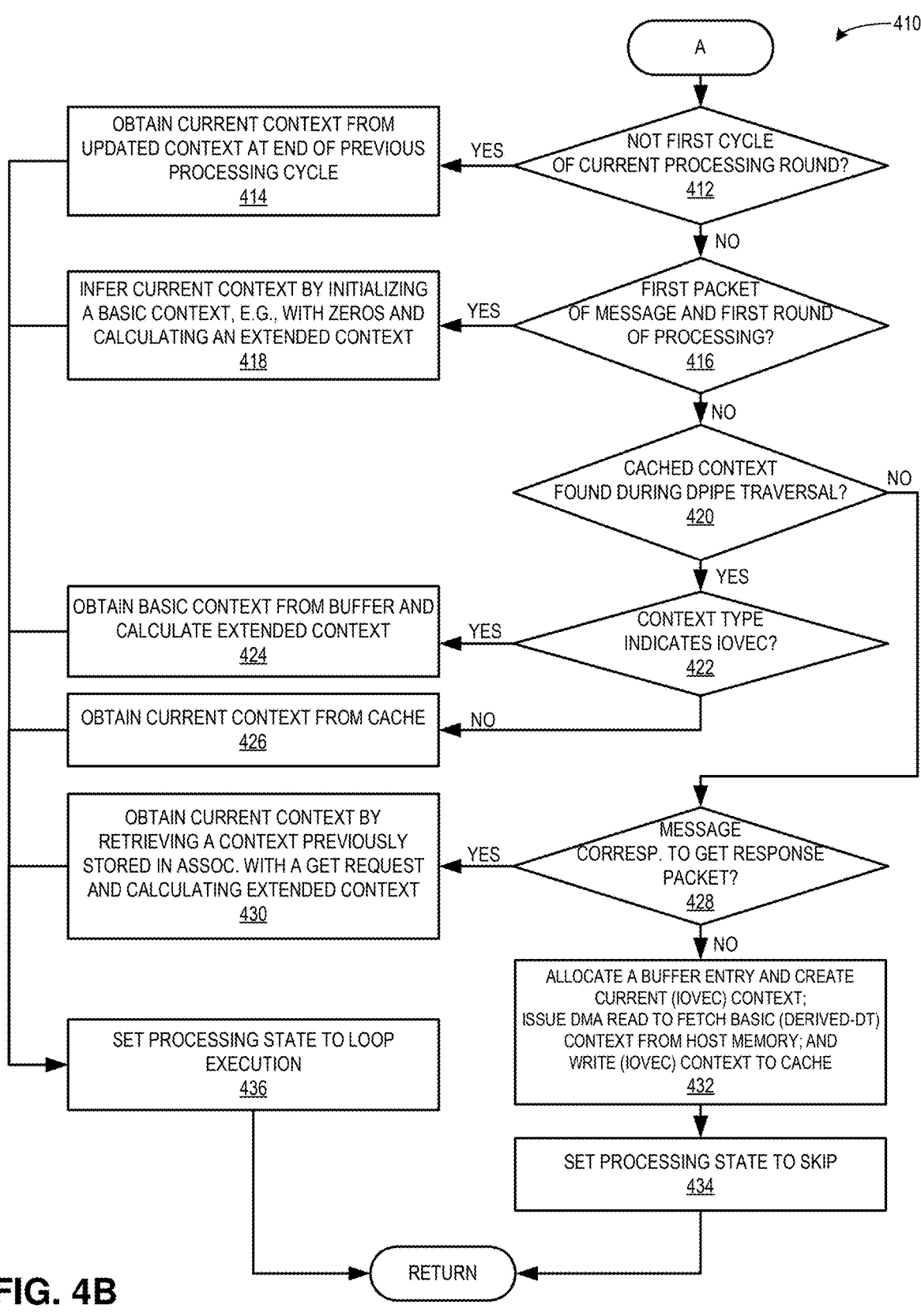
FIG. 4B presents a flowchart illustrating a method which facilitates a unified instruction processor for a DMA scatter/gather engine, including determining a context and state for a Derived-DT, in accordance with an aspect of the present application.

FIG. 4B presents a flowchart 410 illustrating a method which facilitates a unified instruction processor for a DMA scatter/gather engine, including determining a context and state for a Derived-DT, in accordance with an aspect of the present application. If the processing of the instruction is not in a first cycle of a current round of processing (decision 412), the system obtains the current context from the updated context at the end of the previous processing cycle (i.e., as recirculated Derived-DT context from a previous processing cycle) (operation 414), as described above in relation to the operations of Derived-DT processing state unit 204 and current Derived-DT processing context unit 206 of FIG. 2 and below in relation to section 510 of pseudocode 500 in FIG. 5. The system sets the processing state to a "Loop Execution" state (operation 436), as described above in relation to Derived-DT loop execution unit 208 of FIG. 2 and below in relation to section 510 of pseudocode 500 in FIG. 5 and state "DSTT_LOOP_EXEC" 926 of FIG. 9.

If the processing of the instruction is in the first cycle of a current round of processing (decision 412) and if the processing of the instruction is in the first cycle of the current round of processing and is associated with a first packet of the message (decision 416), the system infers the current context by initializing a basic context, e.g., with zeros and calculating an extended context (operation 418), as described above in relation to the operations of Derived- DT processing state unit 204 and current Derived-DT processing context unit 206 and communications 267 with MAC unit 244 of FIG. 2. The system sets the processing state to a "Loop Execution" state (operation 436), as described above in relation to Derived-DT loop execution unit 208 of FIG. 2 and below in relation to section 512 of pseudocode 500 in FIG. 5 and state "DSTT_LOOP_EXEC" 926 of FIG. 9.

If the processing of the instruction is not in the first cycle of the current round of processing and not associated with a first packet of the message (decision 416), and if the cached context is found during the data pipe traversal (e.g., if the inputs include the current context) (decision 420) and if a context type indicates the second type (i.e., indicates IOVEC-DT) (decision 422), the system determines the current context by obtaining a basic context from the buffer and calculating the extended context (operation 424), as described above in relation to the operations of Derived-DT processing state unit 204 and current Derived-DT processing context unit 206 and communications 267 with MAC unit 244 of FIG. 2 and below in relation to section 514 of pseudocode 500 in FIG. 5. The system sets the processing state to a "Loop Execution" state (operation 436), as described above in relation to Derived-DT loop execution unit 208 of FIG. 2 and below in relation to section 514 of pseudocode 500 in FIG. 5 and state "DSTT_LOOP_EXEC" 926 of FIG. 9.

If the cached context is found during the data pipe traversal (decision 420) and if the context type indicates the first type (i.e., indicates Derived-DT and does not indicate IOVEC-DT) (decision 422), the system obtains the current context from the cache (operation 426), as described above in relation to the operations of Derived-DT processing state unit 204 and current Derived-DT processing context unit 206 and below in relation to section 514 of pseudocode 500 in FIG. 5. The system sets the processing state to a "Loop Execution" state (operation 436), as described above in relation to Derived-DT loop execution unit 208 of FIG. 2 and below in relation to section 514 of pseudocode 500 in FIG. 5 and state "DSTT_LOOP_EXEC" 926 of FIG. 9.

If the inputs do not include the current context (decision 420), and if the message corresponds to a GET response packet associated with a GET request (decision 428), the system obtains the current context by retrieving a context previously stored in association with a GET request and calculating the extended context (operation 430), as described above in relation to the operations of Derived-DT processing state unit 204 and current Derived-DT processing context unit 206 of FIG. 2. The system sets the processing state to a "Loop Execution" state (operation 436), as described above in relation to Derived-DT loop execution unit 208 of FIG. 2 and below in relation to section 516 of pseudocode 500 in FIG. 5 and state "DSTT_LOOP_EXEC" 926 of FIG. 9.

If the message does not correspond to a GET response packet associated with a GET request (decision 428), and if no corresponding entry for the current context exists in the buffer (not shown), the system obtains the current context by creating a temporary IOVEC-formatted context, allocating an entry in the buffer (listed in the IOVEC-formatted context), issuing a DMA read to fetch starting or basic (Derived-DT) context from the host memory, and writing the temporary IOVEC-formatted context to the cache (operation 432), as described above in relation to the operations of Derived-DT processing state unit 204, current Derived-DT processing context unit 206, Derived-DT loop execution unit 208, and context-FF fetch unit 210 of FIG. 2. The system sets the processing state to a "Skip" state (operation 434), as described above in relation to FIG. 2 and below in relation to section 518 of pseudocode 500 in FIG. 5 and state "DSTT_SKIP" 928 of FIG. 9. A subsequent round of processing may occur after the starting Derived-DT context has been returned from host memory and temporarily stored in the buffer entry.

Subsequent to operations 434 and 436, the operation returns and continues at operation 408 of FIG. 4A. The system creates DMA instructions corresponding to the received instruction by executing based on the datatype and the identified context and state (operation 408). In this Derived-DT scenario, the system executes operations in the nested loop which represents a multi-dimensional array structure of the Derived-DT.

Figure 4C:
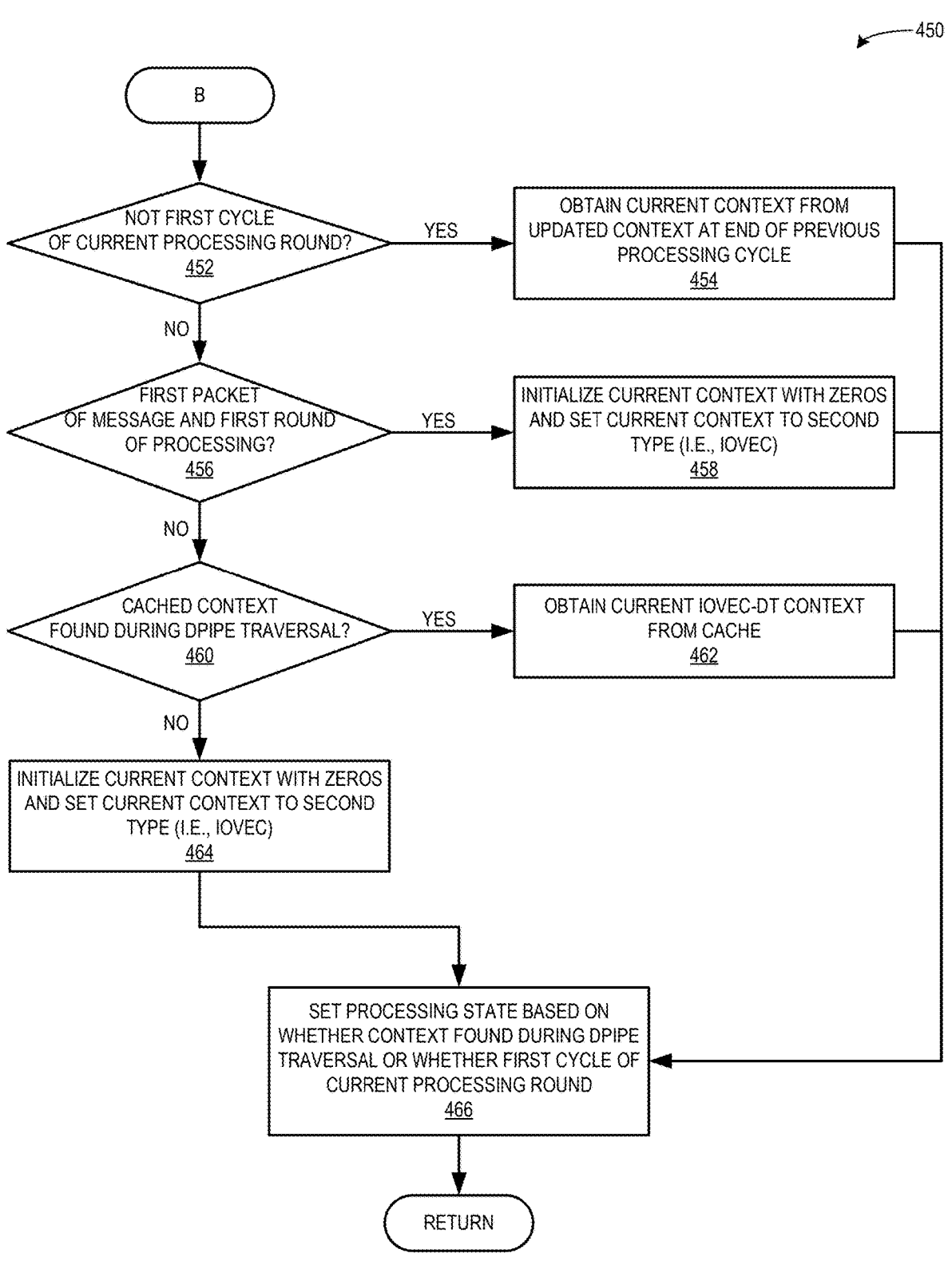
FIG. 4C presents a flowchart illustrating a method which facilitates a unified instruction processor for a DMA scatter/gather engine, including determining a context and state for an IOVEC-DT, in accordance with an aspect of the present application.

FIG. 4C presents a flowchart 450 illustrating a method which facilitates a unified instruction processor for a DMA scatter/gather engine, including determining a context and state for an IOVEC-DT, in accordance with an aspect of the present application. If the processing of the instruction is not in a first cycle of a current round of processing (decision 452), the system obtains the current context from the updated context at the end of the previous processing cycle (operation 454), as described above in relation to the operations of current IOVEC-DT processing context unit 226 of FIG. 2. The system sets the processing state based on whether the context is found during the data pipe traversal or whether the processing is in the first cycle of the current processing round (operation 466), including based on various conditions, e.g.: whether the current context is included as an input to the processing resource; whether the payload transfer is complete; whether the current round of processing comprises a null round of processing; whether a new head-of-context-list entry in the buffer has been read; whether the IOVEC entries have been fetched from host memory; whether the entry in the buffer referenced by the first listed buffer entry in context is valid; whether the message payload comprises a GET response packet associated with a previous GET request handled by the processing resource; whether a value indicates to no longer fetch any IOVEC entries; whether one or more buffer entries are available for allocation; whether the message payload associated with the instruction is eligible for a payload transfer or an IOVEC entry fetch; or whether processing of the instruction is in a first cycle of a current round of processing. Identifying and setting the IOVEC processing state is described below in relation to sections 820, 822, and 824 of pseudocode 810 of FIG. 8B, and examples of IOVEC processing states are described below in relation to states 930, 932, 934, 936, and 938 of FIG. 9.

If the processing of the instruction is in the first cycle of a current round of processing (decision 452), and if the processing of the instruction is in the first cycle of the current round of processing and is associated with a first packet of the message (decision 456), the system initializes the current IOVEC-DT context with all zeroes and sets the current context to the IOVEC type (operation 458), as described above in relation to the operations of current IOVEC-DT processing context unit 226 of FIG. 2. The system sets the processing state based on whether the context is found during the data pipe traversal or whether the processing is in the first cycle of the current processing round (operation 466) and on various conditions, as described below in relation to sections 820, 822, and 824 of pseudocode 810 of FIG. 8B.

If the cached context is found during the data pipe traversal (e.g., if the inputs include the current context) (decision 460), the system may obtain the current IOVEC-DT context from the cache (operation 462), e.g., via engine pipeline 120 of FIG. 1 and input as current context 258 in FIG. 2. The system sets the processing state based on whether the context is found during the data pipe traversal or whether the processing is in the first cycle of the current processing round (operation 466) and on various conditions, as described below in relation to sections 820, 822, and 824 of pseudocode 810 of FIG. 8B.

If the cached context is not found during the data pipe traversal (decision 460), the system initializes the current IOVEC-DT context with all zeroes and sets the current context to the IOVEC type (operation 464), as described above in relation to the operations of current IOVEC-DT processing context unit 226 of FIG. 2. The system sets the processing state based on whether the context is found during the data pipe traversal or whether the processing is in the first cycle of the current processing round (operation 466) and on various conditions, as described below in relation to sections 820, 822, and 824 of pseudocode 810 of FIG. 8B.

Subsequent to operation 466, the operation returns and continues at operation 408 of FIG. 4A. The system creates DMA instructions corresponding to the received instruction by executing based on the datatype and the identified context and state (operation 408). In this IOVEC-DT scenario, the system has fetched the IOVEC entries (whether from host memory or the ICB) and creates the DMA instructions corresponding to the received instruction based on addresses and lengths in the IOVEC entries.

FIG. 5 presents pseudocode (PC) 500 illustrating a method which facilitates a unified instruction processor for a DMA Scatter/Gather engine, including determining a current context and processing state for a Derived-Datatype, in accordance with an aspect of the present application. PC 500 includes a section 502 with notes describing and defining variables used in sections 510, 512, 514, 516, and 518 of PC 500. Each of sections 510-518 may correspond to an "if" or "else if" or "else" block represented by the operations described above in relation to FIG. 4B. For example: section 510 may correspond to decision 412 and operations 414 and 436 of FIG. 4B; section 512 may correspond to decision 416 and operations 418 and 436 of FIG. 4B; section 514 may correspond to decisions 420 and 422 and operations 424, 426, and 436 of FIG. 4B; section 516 may correspond to decision 428 and operations 430 and 436 of FIG. 4B; and section 518 may correspond to operations 432 and 434 of FIG. 4B.

Figure 6:
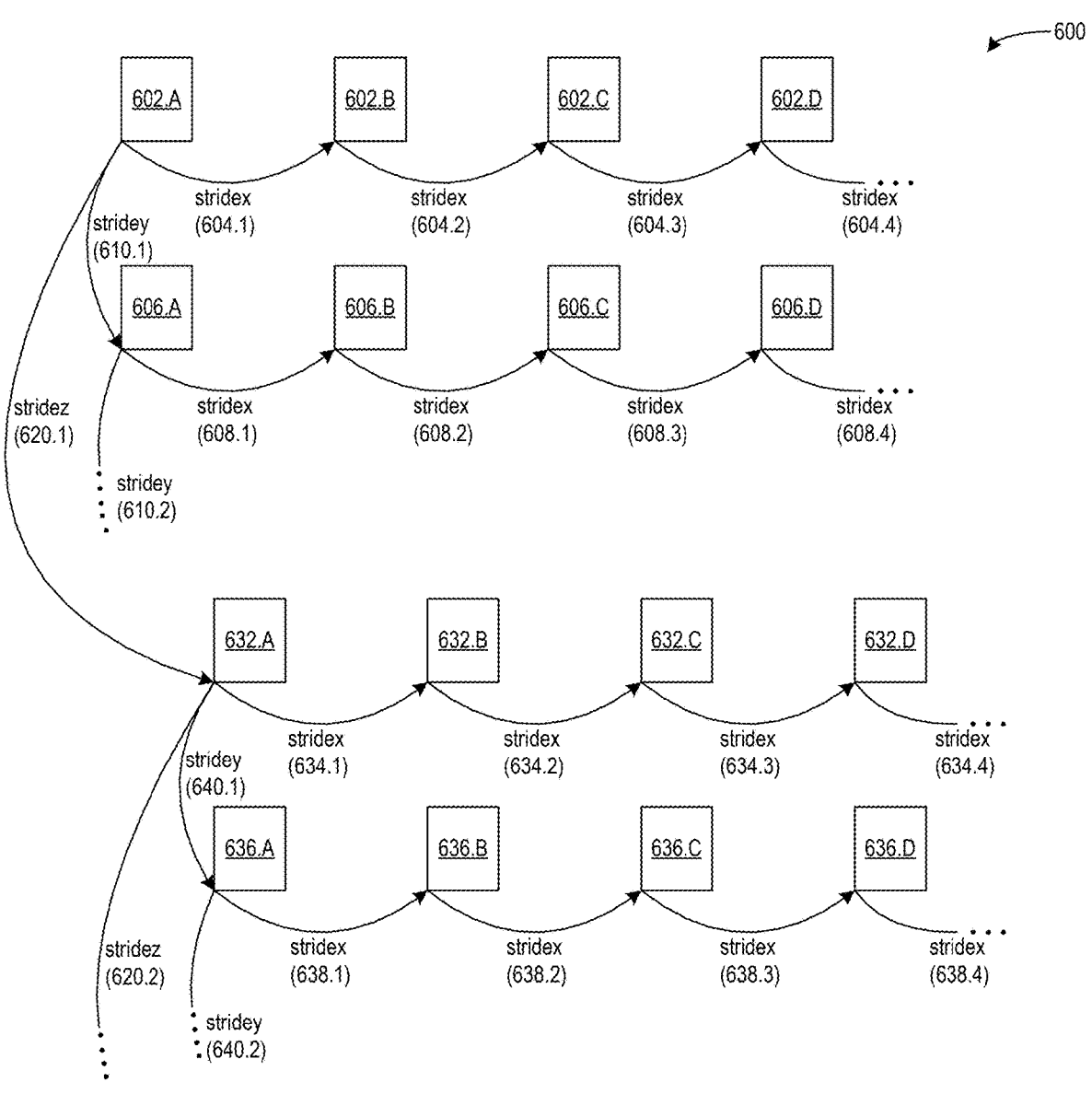
FIG. 6 illustrates a diagram with calculations made during processing of a Derived-DT, in accordance with an aspect of the present application.

FIG. 6 illustrates a diagram 600 with calculations made during processing of a Derived-DT, in accordance with an aspect of the present application. Diagram 600 depicts data elements as squares (e.g., 602, 606, 632, and 636). During the execution of the nested loop, the system may walk through: a first dimension with, e.g., elements 602.A, 602.B, 602.C, and 602.D based on, respectively, a stride in the x-dimension ("stridex") 604.1, 604.2, 604.3, and 604.4; a second dimension based on a stride in the y-dimension ("stridey") 610.1, 610.2, . . . , 640.1, and 640.2, each stridey including a number of first-dimension elements, e.g., 602.A-D, 606.A-D, 632.A-d, and 636.A-D; and a third dimension based on a stride in the z-dimension ("stridez") 620.1, 620.2, . . . , each stridez including a number of second-dimension elements defined by stridey, e.g., 610.1, 610.2, . . . 640.1, 640.2, etc.

Items 650, 652, and 654 illustrate calculations to be performed during processing by during Derived-DT processing (e.g., by Derived-DT processing state unit 204 of FIG. 1 and as depicted in sections 512, 514, and 516 of pseudocode 500 in FIG. 5). Item 650 indicates that the address offset ("addr_offset") which indicates where to being reading data may be calculated as: (currentz*stridez)+ (currenty*stridey)+(current*stridex). Item 650 indicates that "stridey_adj" may be calculated as (stridex*(elementsx−1)) and that this should be subtracted from the current address offset before adding stridey. In addition, item 650 indicates that "stridez_adj" may be calculated as (stridey*(elementsy−1)) and that this should be subtracted from the current address offset before adding stridez. These calculations may be performed by shared MAC unit 244 of FIG. 2 and returned to Derived-DT processing state unit 204 via communications 267, as described below in relation to FIG. 7.

Figure 7:
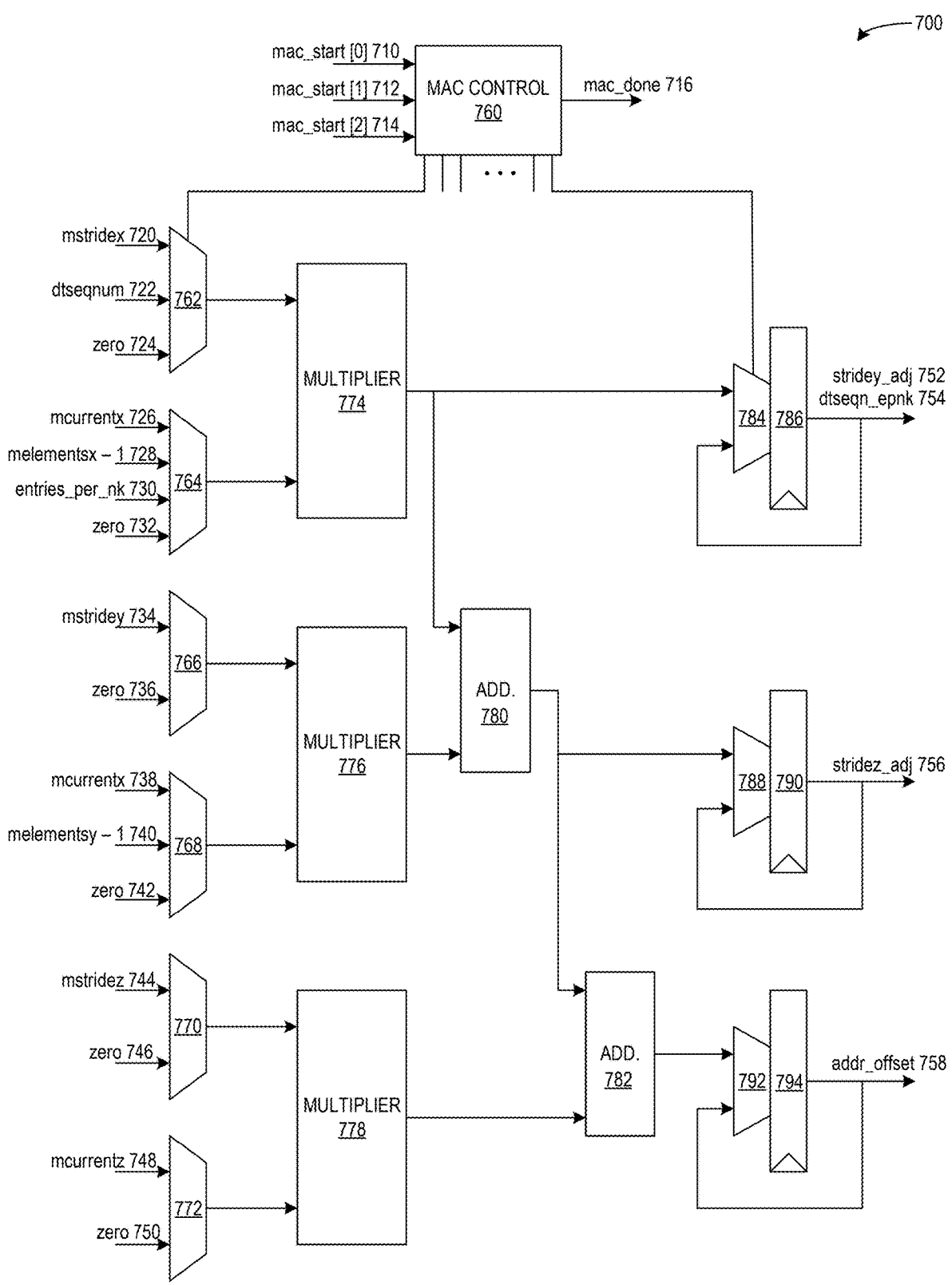
FIG. 7 illustrates a multiply-accumulate (MAC) unit shared between processing operations for a Derived-DT and an IOVEC-DT, in accordance with an aspect of the present application.

FIG. 7 illustrates a multiply-accumulate (MAC) unit 700 shared between processing operations for a Derived-DT and an IOVEC-DT, in accordance with an aspect of the present application. MAC unit 700 can correspond to MAC unit 244 of FIG. 2. MAC unit 700 may include: a MAC controller 760; multiplexers ("mux") 762, 764, 766, 768, 770, and 772; multipliers 774, 776, and 778 (e.g., which may perform 32×16-bit integer multiplication); addition units 780 and 782; and multiplexer/output register pairs 784/786, 788/790, and 792/794.

MAC controller 760 can take as input various start control signals (e.g., "mac_start[0]" 710," "mac_start[1]" 712," and "mac_start[2]" 714") and can return as output "mac_done 716" (indicating a done state). MAC controller 760 may control the inputs to multipliers 774, 776, and 778 as well as the inputs to, e.g., mux 784.

The inputs "dt_seqnum" 722 and "entries_per_nk" 730 may be provided for IOVEC processing only, i.e., during processing by IOVEC-DT execution unit 228 and via communications 287 of FIG. 2. For a "general" IOVEC, which has a fixed number of entries per fixed amount of message payload, these values may be multiplied together (subset of MAC function) to calculate the entry in the IOVEC corresponding to the packet being processed.

During processing of a Derived-DT: mux 762 may receive as input "mstridex" 720 (stridex value from the descriptor) and "zero" 724; mux 764 may receive as input "mcurrentx" 726 (x-dimension loop counter value from context), "melementsx−1" 728 (where melementsx is the elementsx value from the descriptor), and "zero" 732; mux 766 may receive as input "mstridey" 734 (stridey value from the descriptor) and "zero" 736; mux 768 may receive as input "mcurrentx" 738 (x-dimension loop counter value from context), "melementsy−1" 740 (where melementsy is the elementsy value from the descriptor), and "zero" 742; mux 770 may receive as input "mstridez" 744 (stridez value from the descriptor) and "zero" 746; and mux 772 may receive as input "mcurrentz" 748 (z-dimension loop counter value from context) and "zero" 750. The relevant inputs may be selected by each multiplexer and sent to multipliers 774, 776, and 778, and those results may be subsequently sent to addition units 780 and 782. The results of those additions may be sent to multiplexers 788 and 792, which will select whether the result or an updated value is to be stored in corresponding registers 790 and 794, respectively.

For example, the result of the calculation indicated by item 652 in FIG. 6 may be an output of multiplier 774, selected by mux 784, stored in register 786, and output as "stridey_adj" 752. Similarly, the result of the calculation indicated by item 654 in FIG. 6 may be an output of addition unit 780, selected by mux 788, stored in register 790, and output as "stridez_adj" 756. In addition, the result of the calculation indicated by item 650 in FIG. 6 may be an output of addition unit 782, selected by mux 792, stored in register 794, and output as "addr_offset" 758.

FIGS. 8A and 8B present pseudocode (PC) illustrating a method which facilitates a unified instruction processor for a DMA scatter/gather engine, including determining a current context and processing state for an IOVEC-DT, in accordance with an aspect of the present application. FIG. 8A presents PC 800 which includes notes describing and defining variables used in sections 812, 814, 816, 818, 820, 822, and 824 of PC 810 in FIG. 8B. PC 800 is reproduced below (without the double slashes "//" indicating that PC 800 represents comments):

1) MAC unit inputs are mac_start[2].
2) MAC unit outputs are mac_done, mac_dtseqn_epnk (=IOVEC entry number).
3) "tracker_ent_first_round" means this is the first round of processing for the engine tracker entry.
4) "start_of_message" means the first packet of the overall message is being processed.
5) "inp_context.pkt_dn" means packet payload transfer has completed.
6) "inp_context.noproc" means this is a round of Null processing used for context transfer.
7) "do_icb_wait" means unable to process an IOVEC entry, but need to wait for the ICB entry to be presented to the processor so it can be accepted (then end the round of processing).
8) "icb_list_sh_last_cyc" means the ICB entry list in context was right-shifted in the previous cycle, so the new head-of-list ICB entry has not yet been read.
9) "did_ie_proc_ie_fetch" means that we've already done an IE_Proc IE Fetch state transition in this round of processing.
10) "ctxt_icb_valid[0]" means the head-of-list ICB entry is valid (already contains an IOVEC Entry group fetched from host memory).
11) "inp_instr.trk_estt.stail" means no follower instruction has arrived that final context could be transferred to.
12) "inst_PRQ" means this processor is in the "Put-Request" (DMA gather) engine instance.
13) "inp_instr.eom" means there's no follower instruction to transfer final context to. "ie_fetch_none" means don't fetch any more IOVEC entry groups.
14) "icb_ent_avail" means there are one or more ICB entries available for allocation.
15) "not_eligible_for_pyld_xfer" means cannot yet perform payload transfer for the tracker entry being processed. It is currently only eligible for prefetch of IOVEC entries.
16) "icb_refcnt_acc" means ICB can accept a reference count update command.
17) "desc_idt.ent_per_nk" is the number of IOVEC entries mapped to n kB of message payload (n is encoded separately in the descriptor). If ent_per_nk>1, must use the MAC unit to calculate the IOVEC entry number.

FIG. 8B presents PC 810 with sections 812, 814, 816, 818, 820, 822, and 824, where each of sections 812-824 may correspond to an "if" or "else if" or "else" block represented by the operations described above in relation to FIG. 4C. For example: section 812 may correspond to decision 452 and operations 454 and 466 of FIG. 4C; section 814 may correspond to decision 456 and operations 458 and 466 of FIG. 4C; section 816 may correspond to decision 460 and operations 462 and 466 of FIG. 4C; section 818 may correspond to operations 464 and 466 of FIG. 4C; and sections 820, 822, and 824 may correspond to operation 466 of FIG. 4C and operation 408 of FIG. 4A. PC 810 is reproduced below:

for input. A "DSTT_CFF_Fetch" state 920 indicates that context-FF information needs to be fetched from host memory. The system may allocate an ICB entry, issue the DMA read instruction, write IOVEC context to cache (listing the allocated ICB entry), and update the tracker entry to a "DMA-waiting" state. A "DSTT_ICB_Wait" state 922 indicates that context is available (from cache). The context type may be IOVEC (indicating that context-FF has been previously fetched from host memory and is present in the "head" ICB entry listed in the context) and the ICB entry read may be in progress. A "DSTT_MAC_Wait" state 924 indicates that the basic context is ready and that calculation of the extended context (e.g., stride*_adj and addr_offset, as described above in relation to FIG. 6) is being performed by the MAC unit.

```
           // Identify current context
           If (Not first cycle of current processing round),
812            cur_context = <context from previous processing cycle>
           Else if (tracker_ent_first_round && start_of_message),
814            cur_context = <initial context> // all zeroes
               cur_context.ctxt_enc = 1 // IOVEC processing context format
           Else if (Context found during Dpipe traversal),
816            cur_context = <copy_from_inp_context>
           Else,
818            cur_context = <initial_context> // all zeroes
               cur_context.ctxt_enc = 1 // IOVEC processing context format
           // Identify processing state
           If (Context found during Dpipe traversal),
               If (inp_context.pkt_dn || inp_instr.noproc),
                   idt_proc_stt = <Skip>
               Else if (do_icb_wait), idt_proc_stt = <ICB_Wait>
               Else if (icb_list_sh_last_cyc &&
                       !did_ie_proc_or_ie_fetch and ctxt_icb_valid[0]),
                   If ((!inp_instr.trk_estt.stail || (inst_PRQ & !inp_instr.eom)) &
                           !ie_fetch_none & icb_ent_avail),
820                    idt_proc_stt = <IE_Fetch> // fetch another IOVEC entry group
                   Else if (not_eligible_for_pyld_xfer),
                       If (ICB entry was read), idt_proc_stt = icb_vld ? <Skip> : <ICB_Wait>
                       Else, idt_proc_stt = <Skip>
                   Else,
                       idt_proc_stt = icb_vld ? icb_refont_acc ?
                               <IE Proc> : <Skip> : <ICB_Wait>
               Else,
                   idt_proc_stt = ie_fetch_none ? <Skip> : icb_ent_avail ? <IE_Fetch> : <Skip>
               Else if (First cycle of this round of processing),
                   If (icb_ent_avail),
                       If (desc_idt.ent_per_nk==1), idt_proc_stt = <IE_Fetch>
                       Else,
822                        idt_proc_stt = mac_done ? <IE_Fetch> : <MAC_Wait>
                           mac_start[2] = (idt_proc_stt!=<MAC_Wait>)
                   Else,
                       idt_proc_stt = (last_idt_proc_stt==<MAC_Wait> &&
                               !mac_done) ? <MAC_Wait> : <Skip>
               Else,
824                idt_proc_stt = !icb_ent_avail ? <Skip> : ie_fetch_none ? <Skip> : <IE_Fetch>
```

Figure 9:
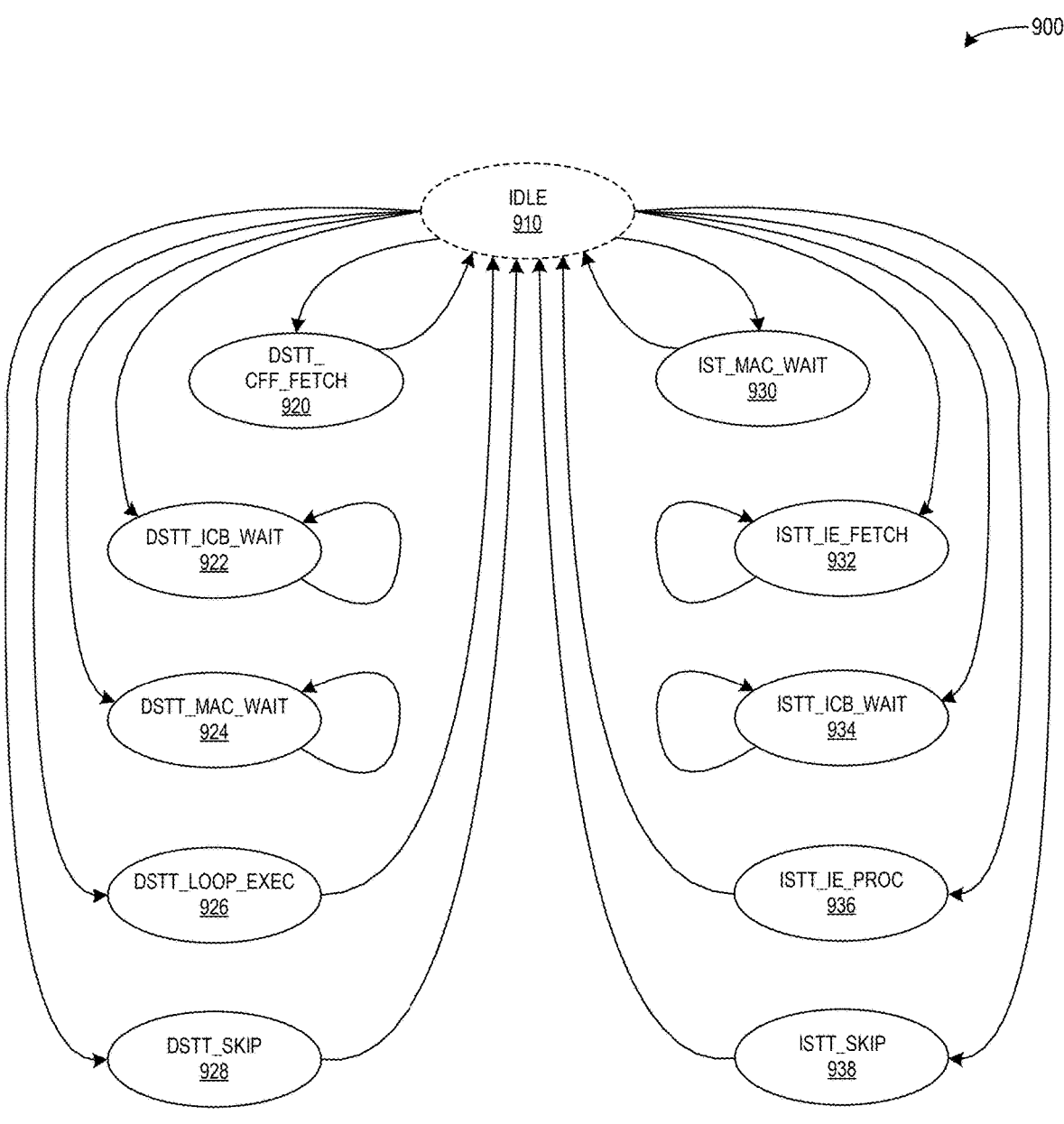
FIG. 9 illustrates a diagram of processing state transitions for a Derived-DT and an IOVEC-DT, in accordance with an aspect of the present application.

FIG. 9 illustrates a diagram 900 of processing state transitions for a Derived-DT and an IOVEC-DT, in accordance with an aspect of the present application. An "Idle" state 910 is depicted with a dashed line, indicating a "zero-time" state. The Idle state may occur when a round of processing completes in some non-idle state and a new round of processing (of some other engine tracker entry) begins with a non-idle state in the next cycle. The Idle state may be viewed as a "zero-time state," i.e., a symbolic traversal of the idle state. For example, a symbolic zero-time traversal of the Idle state may occur when the system moves from DSTT_CFF_Fetch state 920 to ISTT_MAC_Wait state 930 or from DSTT_CFF_Fetch state 920 to DSTT_ICB_Wait state 922.

An Idle 910 state indicates that no processing is being performed in the current cycle and that the system is waiting A "DSTT_Loop_Exec" state 926 indicates that the complete context is ready. The system may execute the Derived-DT nested loop. The system may issue the DMA read/write instruction for payload transfer and update the addr_offset and byte_cnt. When state 926 is reached, the DTP may generally remain in this state until its output queue credit is exhausted or the packet payload transfer is complete. State 926 can correspond to operation 436 of FIG. 4B and operation 408 of FIG. 4A. State 926 can also correspond to the function "<Loop Exec>" as indicated in sections 510, 512, 514, and 516 of pseudocode 500 in FIG. 5.

A "DSTT_Skip" state 928 indicates that no Derived-DT processing can be performed during this cycle. This may occur for various reasons, e.g., an ICB entry may need to be allocated, but all ICB entries may currently be in use. The system exits the round of Derived-DT processing. If applicable, the system may start a new round of processing (for a different engine tracker entry) next cycle.

An "ISTT_MAC_Wait" state 930 indicates that IOVEC entries need to be fetched from host memory and that the system (e.g., MAC unit 244 of FIG. 2) is performing calculation of the first entry in the IOVEC entry to be fetched. An "ISTT_IE_Fetch" state 932 indicates that IOVEC entries need to be fetched from host memory. The system may allocate an ICB entry, issue the DMA read instruction, and update the IOVEC context (e.g., add the allocated ICB entry to list). State 932 can correspond to the function "<IE_Fetch>" as indicated in sections 820, 822, and 824 of pseudocode 810 in FIG. 8B. An "ISTT_ICB_Wait" state 934 indicates that the IOVEC context is available, IOVEC entries are present in the "head" ICB entry listed in the context, and an ICB entry read is in progress.

An "ISTT_IE_Proc" state 936 indicates that the IOVEC context is available, the ICB entry read has completed, and IOVEC entries are available for processing. The system may process the IOVEC entries, issue the DMA read/write instruction(s), and update the context (e.g., IOVEC_ent_ptr and byte_cnt). When state 936 is reached, the DTP may generally remain in this state until its output queue credit is exhausted, all IOVEC entries in the current ICB entry are consumed, or the packet payload transfer is complete. If all IOVEC entries in the current ICB entry are consumed, the DTP may transition to ISTT_IE_Fetch state 932, if additional IOVEC entry fetches are required. State 936 can correspond to operation 466 of FIG. 4C and operation 408 of FIG. 4A. State 936 can also correspond to the function "<IE_Proc>" as indicated in section 820 of pseudocode 810 in FIG. 8B.

An "ISTT_Skip" state 938 indicates that no IOVEC-DT processing can be performed during this cycle. This may occur for various reasons, e.g., an ICB entry may need to be allocated, but all ICB entries may currently be in use. The system exits the round of IOVEC-DT processing. If applicable, the system may start a new round of processing (for a different engine tracker entry) next cycle.

Figure 10:
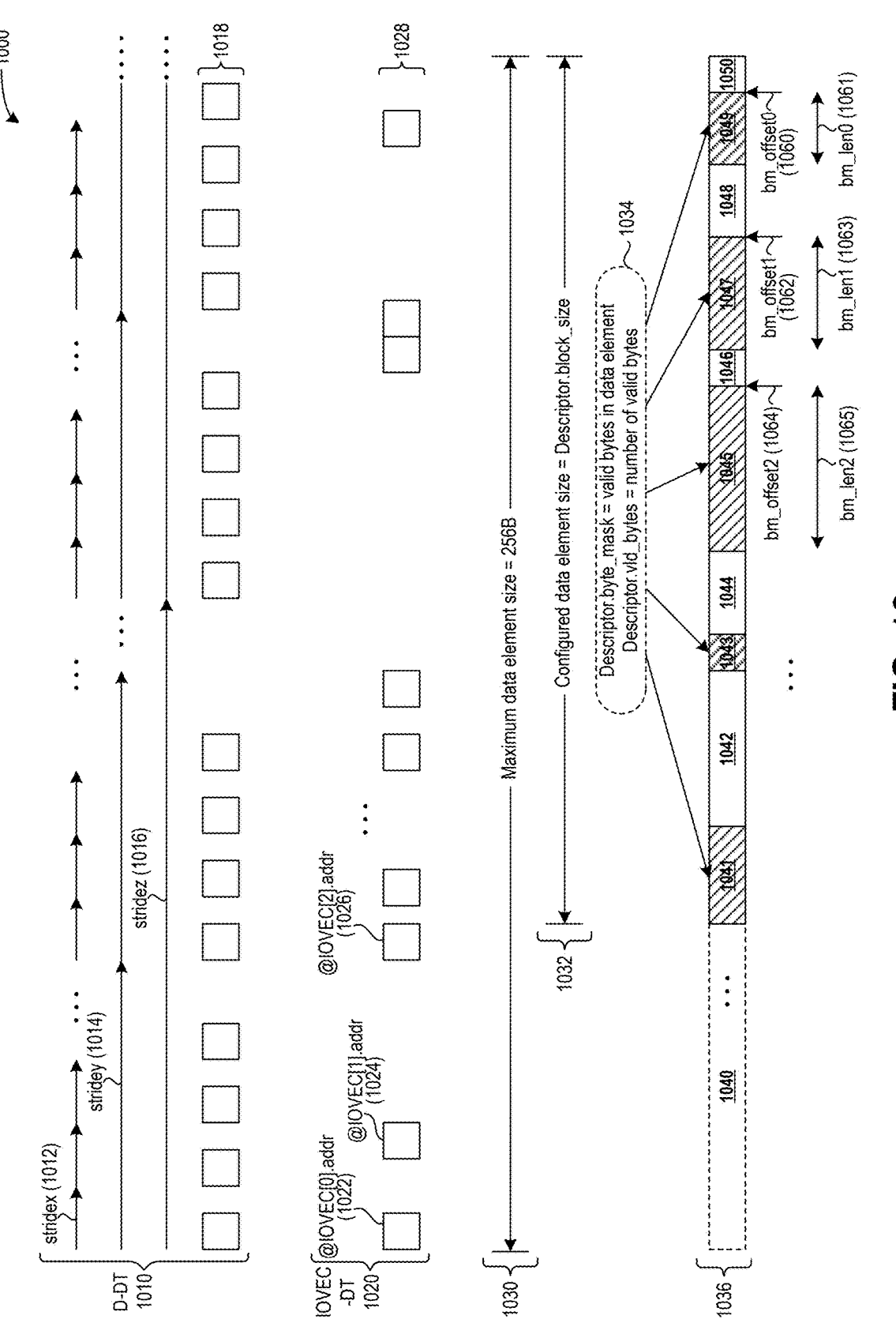
FIG. 10 illustrates an overview of byte-mask processing, in accordance with an aspect of the present application.

FIG. 10 illustrates an overview 1000 of byte-mask processing, in accordance with an aspect of the present application. Overview 1000 includes: a section 1010 depicting a Derived-DT ("D-DT"); a section 1020 depicting an IOVEC-DT; and items 1030, 1032, 1034, and 1036 describing a byte-mask. Section 1010 illustrates the Derived-DT, which describes many fixed-size elements arranged in a regular pattern in host memory as described by multiple (e.g., 1, 2, 3) nested loops, with a particular stride value, e.g., stridex (1012), stridey (1014), or stridez (1016) per loop, as described above in relation to FIG. 6. Section 1010 can include data elements 1018 (indicated by squares) with a maximum data element size of, e.g., 256 bytes.

Section 1020 illustrates the IOVEC-DT, which describes many fixed-size data elements arranged in host memory at random locations, as defined by the IOVEC, e.g., @IOVEC [0].addr (1022), @IOVEC[1].addr (1024), and @IOVEC[2] addr (1026). Section 1020 can include data elements 1028 (indicated by squares) with a maximum data element size of, e.g., 256 bytes.

Item 1030 illustrates that the maximum data element size can be 256 bytes. Item 1032 indicates that the configured data element size may be equal to the "Descriptor. block_size" value. The "Descriptor.bs_last" may indicate the last x-dimension element of the Derived-DT, which may be a portion of the standard data element. Item 1034 indicates that the "Descriptor.byte_mask" indicates the valid bytes in the data element, while the "Descriptor.vld_bytes" indicates the number of valid bytes. The "Descriptor.vb_last" may indicate the last x-dimension element of the Derived-DT—as the last x-dimension element may be a portion of the standard data element, it may comprise a smaller number of valid bytes.

Item 1036 can indicate a single data element which includes portions 1040-1050. The shaded portions (e.g., 1041, 1043, 1045, 1047, and 1049) may indicate valid bytes of data based on the byte-mask represented by item 1034. Each of the arrows from item 1034 to the shaded portions may correspond to an offset and length of the data in host memory. For example, the valid bytes of single data element 1036 may correspond to: a bm_offset0 (1060) and a bm_len0 (1061), corresponding to shaded portion 1049; a bm_offset1 (1062) and a bm_len1 (1063), corresponding to shaded portion 1047; a bm_offset2 (1064) and a bm_len2 (1065), corresponding to shaded portion 1045, and so on, with each shaded portion represented by bm_offsetX and bm_lenX values.

In a gather operation, the "full" data element defined by "Descriptor.block_size" may be read from host memory, and the valid bytes may be packed together in the packet. In a scatter operation, a data element may be transferred by taking the number of bytes (defined by "Descriptor. vld_bytes" from the received packet) and scattering to an address range (of "Descriptor.block_size") in host memory (as defined by "Descriptor.byte_mask").

The value "elem_addr" can indicate the address of the first byte of the data element in host memory. For the Derived-DT, elem_addr may be defined by the address from the instruction input to the engine, plus the offset reached by various strides resulting from the nested loop execution. For the general IOVEC-DT, elem_addr may be defined by the address from an IOVEC entry, possibly added to the address from the instruction (if the value of "Descriptor.relative is equal to "1"). The first byte of the data element may or may not be valid based on the byte-mask, which does not affect elem_addr.

The DMA scatter engine may process a byte-masked data element over multiple cycles in the "DSTT_Loop_Exec" or the "ISTT_IE_Proc" processing states (respectively, states 926 and 936 of FIG. 9 and as described above, respectively, for Derived-DT loop execution unit 208 and IOVEC-DT execution unit 228 of FIG. 2), as needed. During DSTT_Loop_Exec state 926, the loop counter (e.g., "currentx") may not be incremented until the complete data element has been processed. During ISTT_IE_Proc state 936, the DTP may dwell on the same IOVEC entry until the complete data element has been processed. During byte-mask processing (e.g., by byte-mask processing unit 246 of FIG. 2), the system can provide a series of offsets (bm_offsetN) and lengths (bm_lenN), with one offset/length pair per cycle. The system may create the DMA instructions (e.g., by DMA instruction formation units 212 or 232 of FIG. 2) by using the offset/length pairs to generate the series of DMA write instructions. For example, based on item 1036 in FIG. 10: a "Write0" DMA instruction may indicate that bm_len0 bytes are to be taken from the packet and written to elem_addr+ bm_offset0; a "Write1" DMA instruction may indicate that bm_len1 bytes are to be taken from the packet and written to elem_addr+bm_offset1; etc.

FIG. 11 illustrates a computer-readable medium 1100 which facilitates a unified instruction processor for a DMA scatter/gather engine, in accordance with an aspect of the present application. CRM 1100 can be a non-transitory computer-readable medium or device storing instructions that when executed by a computer or processor cause the computer or processor to perform a method, including the methods and operations described herein. CRM 1100 may store instructions 1110 to receive inputs including an instruction to read or write a payload of a message, a tracker state indicating a round of processing for the instruction, and a descriptor of a datatype defining organization of the message payload, as described above in relation to inputs 168, 170, and 172 to DTP 126 of FIG. 1 and inputs 252, 254, and 256 to DTP 200 of FIG. 2.

CRM 1100 may store instructions 1120 to identify a current context and a processing state for the instruction, as described above in relation to Derived-DT processing state unit 204, current Derived-DT processing context unit 206, IOVEC-DT processing state unit 224, and current IOVEC-DT processing context unit 226 of FIG. 2 and the operations in FIGS. 4A, 4B, and 4C. Identifying the current context and processing state for the Derived-DT is described above in relation to pseudocode 500 of FIG. 5. Identifying the current context and processing state for the IOVEC-DT is described above in relation to pseudocode 800 and 810 of FIGS. 8A and 8B.

CRM 1100 may store instructions 1130 to, in response to the datatype descriptor indicating a first type (e.g., Derived-DT), obtain the current context associated with the first type from a host memory or a cache, as described above in relation to operations 414, 416, 424, 426, and 430 of FIG. 4B.

CRM 1100 may store instructions 1140 to, in response to the datatype descriptor indicating a first type, set the processing state to a first execution state, as described above in relation to operation 436 of FIG. 4B, sections 510, 512, 514, and 516 (i.e., "<Loop_Exec>") of pseudocode 500 in FIG. 5, and DSTT_Loop_Exec state 926 in FIG. 9.

CRM 1100 may store instructions 1150 to, in response to the datatype descriptor indicating a first type, create direct memory access (DMA) instructions corresponding to the received instruction by executing operations in a nested loop which represents a multi-dimensional array structure of the first type, as described above in relation to Derived-DT loop execution unit 208 and DMA instruction formation unit 212 of FIG. 2 and operation 408 of FIG. 4A.

CRM 1100 may store instructions 1160 to, in response to the datatype descriptor indicating a second type (e.g., IOVEC-DT), obtain the current context associated with the second type by fetching vector entries from a buffer, as described above in relation to sections 820, 822, and 824 of pseudocode 810 in FIG. 8.

CRM 1100 may store instructions 1170 to, in response to the datatype descriptor indicating a second type, set the processing state to a second execution state, as described above in relation to operation 466 of FIG. 4C, sections 820, 822, and 824 of pseudocode 810 in FIG. 8, and states 930-938 of FIG. 9.

CRM 1100 may store instructions 1180 to, in response to the datatype descriptor indicating a second type, create the DMA instructions corresponding to the received instruction based on addresses and lengths in the vector entries of the second type, as described above in relation to IOVEC-DT execution unit 228 and DMA instruction formation unit 232 of FIG. 2 and operation 408 of FIG. 4A.

CRM 1100 may include more instructions than those shown in FIG. 11. For example, CRM 1100 may also store instructions to execute the operations described above in relation to: the architecture of FIG. 1; the communications and operations of FIG. 2; the operations depicted in the flowcharts of FIGS. 4A, 4B, and 4C; and the pseudocode of FIGS. 5, 8A, and 8B.

In general, the disclosed aspects provide a method, NIC, and non-transitory computer-readable storage medium for facilitating a unified instruction processor for a DMA scatter/gather engine. In one aspect, the system receives, by a processing resource in a network interface card (NIC), inputs including an instruction to read or write a payload of a message, a tracker state indicating a round of processing for the instruction, and a descriptor of a datatype defining organization of the message payload. The system identifies a current context and a processing state for the instruction. In response to the datatype descriptor indicating a first type, the system: obtains the current context associated with the first type from a host memory or a cache of the NIC; sets the processing state to a first execution state; and creates direct memory access (DMA) instructions corresponding to the received instruction by executing operations in a nested loop which represents a multi-dimensional array structure of the first type. In response to the datatype descriptor indicating a second type, the system: obtains the current context associated with the second type by fetching vector entries from a buffer of the NIC; sets the processing state to a second execution state; and creates the DMA instructions corresponding to the received instruction based on addresses and lengths in the vector entries of the second type.

In a variation on this aspect, the first type of datatype descriptor comprises a representation of the multi-dimensional array structure which includes a number of elements in each dimension, a size of an element to be transferred, and a stride in each dimension. The second type of datatype descriptor comprises a reference to an input/output vector (IOVEC) with entries indicating addresses and lengths of data to be read from or written to the host memory.

In a further variation on this aspect, in response to the datatype descriptor indicating the first type, the system performs at least one of: obtains the current context from an updated context of a previous processing cycle in response to determining that processing of the instruction is not in a first cycle of a current round of processing; infers the current context by initializing a basic context with zeros and calculating an extended context in response to determining that the processing of the instruction is in the first cycle of the current round of processing and is associated with a first packet of the message; determines the current context by obtaining a basic context from the buffer and calculating the extended context in response to the inputs including the current context and in response to a context type indicating the second type; obtains the current context from the cache in response to the context type indicating the first type; obtains the current context by retrieving a context previously stored in association with a GET request and calculating the extended context in response to the message corresponding to a GET response packet associated with the previous GET request; or obtains the current context by allocating an entry in the buffer and issuing a DMA read to fetch context from the host memory in response to detecting no corresponding entry for the current context in the buffer.

In a further variation, the system calculates the extended context by computing, by a multiply-accumulate (MAC) unit, an address offset to be used while executing the operations in the nested loop which represents the multi-dimensional array structure of the first type.

In a further variation, the system computes the address offset by: prior to executing the operations in the nested loop, calculating, by the MAC unit, adjustments in stride for at least two of the dimensions in the multi-dimensional array structure; and identifying a current location of processing in the nested loop based on the calculated adjustments, thereby eliminating computing the address offset for each operation in the nested loop.

In a further variation, in response to the datatype descriptor indicating the second type, the system performs at least one of: obtains the current context from an updated context of a previous processing cycle in response to determining that processing of the instruction is not in a first cycle of a current round of processing; obtains the current context by initializing the current context with zeros and setting the context type as indicating the second type in response to determining that the processing of the instruction is in the first cycle of the current round of processing and associated with a first packet of the message; obtains the current context from the cache in response to determining that the current context is received as an input by the processor; or obtains the current context by initializing the current context with zeros and setting the context type as indicating the second type.

In a further variation, in response to the datatype descriptor indicating the second type, the system identifies the processing state for the instruction based on at least one of: whether the current context is included as an input to the processing resource; whether the payload transfer is complete; whether the current round of processing comprises a null round of processing; whether a new head-of-context-list entry in the buffer has been read; whether the IOVEC entries have been fetched from host memory; whether the head-of-context-list entry in the buffer is valid; whether the message payload comprises a GET response packet associated with a previous GET request handled by the processing resource; whether a value indicates to no longer fetch any IOVEC entries; whether one or more buffer entries are available for allocation; whether the message payload associated with the instruction is eligible for a payload transfer or an IOVEC entry fetch; or whether processing of the instruction is in a first cycle of a current round of processing.

In a further variation, the system identifies, by a multiply-accumulate (MAC) unit, an IOVEC entry which addresses a first byte of the message payload based on at least one of: a datatype offset included in the instruction and indicating a byte offset within the message payload corresponding to the first byte of the message payload; a predetermined number of bytes corresponding to a group of bytes; a sequence number associated with the datatype offset; or a value indicating a number of IOVEC entries addressing a respective group of bytes of the message payload.

In a further variation, the system determines that the datatype descriptor indicates a byte-mask to be used in creating the DMA instructions in response to determining that the datatype descriptor indicates the first type or the second type, wherein the byte-mask comprises bits indicating whether a corresponding byte of a data element is valid. Creating the DMA instructions corresponding to the instruction by executing operations in the nested loop comprises: obtaining a first series of offsets and lengths by applying the byte-mask to the operations in the nested loop; and creating the DMA instructions based on the obtained first series of offsets and lengths. Creating the DMA instructions corresponding to the instruction based on addresses and lengths in the vector entries comprises: obtaining a second series of offsets and lengths by applying the byte-mask to the vector entries; and creating the DMA instructions based on the obtained second series of offsets and lengths.

In a further variation, the system transmits at least one of the created DMA instructions. In response to transmitting the at least one created DMA instruction, the system performs at least one of: recirculating the current context in response to determining that the current round of processing of the instruction has not completed or that processing of the instruction has not completed; or writing the current context to the cache in response to determining that the current round of processing of the instruction has completed or that the processing of the instruction has completed.

Another aspect provides a network interface card (NIC) with circuitry to perform the operations described herein, as described above in relation to, e.g., engine 110 of FIG. 1, DTP 200 of FIG. 2, the operations of FIGS. 4A, 4B, and 4C, and the pseudocode of FIGS. 5, 8A, and 8B.

Yet another aspect provides a non-transitory computer-readable storage medium storing instructions that when executed by a computer cause the computer to perform the method and operations described herein, as described above in relation to, e.g., engine 110 of FIG. 1, DTP 200 of FIG. 2, the operations of FIGS. 4A, 4B, and 4C, and the pseudocode of FIGS. 5, 8A, and 8B.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   receiving, by a processing resource in a network interface card (NIC), inputs including an instruction to read or write a payload of a message, a tracker state indicating a round of processing for the instruction, and a descriptor of a datatype defining organization of the message payload;
   identifying a current context and a processing state for the instruction;
   in response to the datatype descriptor indicating a first type:
      obtaining the current context associated with the first type from a host memory or a cache of the NIC;
      setting the processing state to a first execution state; and
      creating direct memory access (DMA) instructions corresponding to the received instruction by executing operations in a nested loop which represents a multi-dimensional array structure of the first type; and
   in response to the datatype descriptor indicating a second type:
      obtaining the current context associated with the second type by fetching vector entries from a buffer of the NIC;
      setting the processing state to a second execution state; and
      creating the DMA instructions corresponding to the received instruction based on addresses and lengths in the vector entries of the second type.

2. The method of claim 1,
   wherein the first type of datatype descriptor comprises a representation of the multi-dimensional array structure which includes a number of elements in each dimension, a size of an element to be transferred, and a stride in each dimension; and wherein the second type of datatype descriptor comprises a reference to an input/output vector (IOVEC) with entries indicating addresses and lengths of data to be read from or written to the host memory.

3. The method of claim 2, wherein in response to the datatype descriptor indicating the first type, the method further comprises at least one of:

obtaining the current context from an updated context of a previous processing cycle in response to determining that processing of the instruction is not in a first cycle of a current round of processing;

inferring the current context by initializing a basic context with zeros and calculating an extended context in response to determining that the processing of the instruction is in the first cycle of the current round of processing and is associated with a first packet of the message;

determining the current context by obtaining a basic context from the buffer and calculating the extended context in response to the inputs including the current context and in response to a context type indicating the second type;

obtaining the current context from the cache in response to the context type indicating the first type;

obtaining the current context by retrieving a context previously stored in association with a GET request and calculating the extended context in response to the message corresponding to a GET response packet associated with the previous GET request; or obtaining the current context by allocating an entry in the buffer and issuing a DMA read to fetch context from the host memory in response to detecting no corresponding entry for the current context in the buffer.

4. The method of claim 3, wherein calculating the extended context comprises:

computing, by a multiply-accumulate (MAC) unit, an address offset to be used while executing the operations in the nested loop which represents the multi-dimensional array structure of the first type.

5. The method of claim 4, wherein computing the address offset comprises:

prior to executing the operations in the nested loop, calculating, by the MAC unit, adjustments in stride for at least two of the dimensions in the multi-dimensional array structure; and identifying a current location of processing in the nested loop based on the calculated adjustments, thereby eliminating computing the address offset for each operation in the nested loop.

6. The method of claim 2, wherein in response to the datatype descriptor indicating the second type, the method further comprises at least one of:

obtaining the current context from an updated context of a previous processing cycle in response to determining that processing of the instruction is not in a first cycle of a current round of processing;

obtaining the current context by initializing the current context with zeros and setting the context type as indicating the second type in response to determining that the processing of the instruction is in the first cycle of the current round of processing and associated with a first packet of the message;

obtaining the current context from the cache in response to determining that the current context is received as an input by the processor; or obtaining the current context by initializing the current context with zeros and setting the context type as indicating the second type.

7. The method of claim 2, wherein in response to the datatype descriptor indicating the second type, the method further comprises:

identifying the processing state for the instruction based on at least one of:

whether the current context is included as an input to the processing resource;

whether the payload transfer is complete;

whether the current round of processing comprises a null round of processing;

whether a new head-of-context-list entry in the buffer has been read;

whether the IOVEC entries have been fetched from host memory;

whether the head-of-context-list entry in the buffer is valid;

whether the message payload comprises a GET response packet associated with a previous GET request handled by the processing resource;

whether a value indicates to no longer fetch any IOVEC entries;

whether one or more buffer entries are available for allocation;

whether the message payload associated with the instruction is eligible for a payload transfer or an IOVEC entry fetch; or whether processing of the instruction is in a first cycle of a current round of processing.

8. The method of claim 2, further comprising:

identifying, by a multiply-accumulate (MAC) unit, an IOVEC entry which addresses a first byte of the message payload based on at least one of:

a datatype offset included in the instruction and indicating a byte offset within the message payload corresponding to the first byte of the message payload;

a predetermined number of bytes corresponding to a group of bytes;

a sequence number associated with the datatype offset; or a value indicating a number of IOVEC entries addressing a respective group of bytes of the message payload.

9. The method of claim 2, further comprising:

determining that the datatype descriptor indicates a byte-mask to be used in creating the DMA instructions in response to determining that the datatype descriptor indicates the first type or the second type, wherein the byte-mask comprises bits indicating whether a corresponding byte of a data element is valid;

wherein creating the DMA instructions corresponding to the instruction by executing operations in the nested loop comprises:

obtaining a first series of offsets and lengths by applying the byte-mask to the operations in the nested loop; and creating the DMA instructions based on the obtained first series of offsets and lengths; and wherein creating the DMA instructions corresponding to the instruction based on addresses and lengths in the vector entries comprises:

obtaining a second series of offsets and lengths by applying the byte-mask to the vector entries; and creating the DMA instructions based on the obtained second series of offsets and lengths.

10. The method of claim 1, further comprising:

transmitting at least one of the created DMA instructions;

in response to transmitting the at least one created DMA instruction, performing at least one of:

recirculating the current context in response to determining that the current round of processing of the instruction has not completed or that processing of the instruction has not completed; or writing the current context to the cache in response to determining that the current round of processing of the instruction has completed or that the processing of the instruction has completed.

11. A network interface card (NIC) comprising circuitry to:

receive, by a processing resource of the NIC, inputs including an instruction to read or write a payload of a message, a tracker state indicating a round of processing for the instruction, and a descriptor of a datatype defining organization of the message payload;

identify a current context and a processing state for the instruction;

in response to the datatype descriptor indicating a first type:

obtain the current context associated with the first type from a host memory or a cache of the NIC;

set the processing state to a first execution state; and create direct memory access (DMA) instructions corresponding to the received instruction by executing operations in a nested loop which represents a multi-dimensional array structure of the first type; and in response to the datatype descriptor indicating a second type:

obtain the current context associated with the second type by fetching vector entries from a buffer of the NIC;

set the processing state to a second execution state; and create the DMA instructions corresponding to the received instruction based on addresses and lengths in the vector entries of the second type.

12. The NIC of claim 11, wherein the first type of datatype descriptor comprises a representation of the multi-dimensional array structure which includes a number of elements in each dimension, a size of an element to be transferred, and a stride in each dimension; and wherein the second type of datatype descriptor comprises a reference to an input/output vector (IOVEC) with entries indicating addresses and lengths of data to be read from or written to the host memory.

13. The NIC of claim 12, wherein in response to the datatype descriptor indicating the first type, the circuitry is further to:

obtain the current context from the updated context of a previously processing cycle in response to determining that processing of the instruction is not in a first cycle of a current round of processing;

infer the current context by initializing a basic context with zeros and calculating an extended context in response to determining that the processing of the instruction is in the first cycle of the current round of processing and is associated with a first packet of the message;

determine the current context by obtaining a basic context from the buffer and calculating the extended context in response to the inputs including the current context and in response to a context type indicating the second type;

obtain the current context from the cache in response to the context type indicating the first type;

obtain the current context by retrieving a context previously stored in association with a GET request and calculating the extended context in response to the message corresponding to a GET response packet associated with the previous GET request; and obtain the current context by allocating an entry in the buffer and issuing a DMA read to fetch context from the host memory in response to detecting no corresponding entry for the current context in the buffer.

14. The NIC of claim 13, wherein the circuitry to calculate the extended context is further to:

compute, by a multiply-accumulate (MAC) unit of the NIC, an address offset to be used while the executing operations in the nested loop which represents the multi-dimensional array structure of the first type;

wherein the circuitry to compute the address offset is further to:

prior to executing the operations in the nested loop, calculate, by the MAC unit, adjustments in stride for at least two of the dimensions in the multi-dimensional array structure; and identify a current location of processing in the nested loop based on the calculated adjustments, thereby eliminating computing the address offset for each operation in the nested loop.

15. The NIC of claim 12, wherein in response to the datatype descriptor indicating the second type, the circuitry is further to:

obtain the current context from the cache in response to determining that processing of the instruction is not in a first cycle of a current round of processing;

obtain the current context by initializing the current context with zeros and setting the context type as indicating the second type in response to determining that the processing of the instruction is in the first cycle of the current round of processing and associated with a first packet of the message;

obtain the current context from the cache in response to determining that the current context is received as an input by the processor; and obtain the current context by initializing the current context with zeros and setting the context type as indicating the second type.

16. The NIC of claim 12, wherein in response to the datatype descriptor indicating the second type, the circuitry is further to:

identify the processing state for the instruction based on at least one of:

whether the current context is included as an input to the processing resource;

whether the payload transfer is complete;

whether the current round of processing comprises a null round of processing;

whether a new head-of-context-list entry in the buffer has been read;

whether the IOVEC entries have been fetched from host memory;

whether the head-of-context-list entry in the buffer is valid;

whether the message payload comprises a GET response packet associated with a previous GET request handled by the processing resource;

whether a value indicates to no longer fetch any IOVEC entries;

whether one or more buffer entries are available for allocation;

whether the message payload associated with the instruction is eligible for a payload transfer or an IOVEC entry fetch; or whether processing of the instruction is in a first cycle of a current round of processing.

17. The NIC of claim 12, the circuitry further to:

identify, by a multiply-accumulate (MAC) unit, an IOVEC entry which addresses a first byte of the message payload based on at least one of:

a datatype offset included in the instruction and indicating a byte offset within the message payload corresponding to the first byte of the message payload;

a predetermined number of bytes corresponding to a group of bytes;

a sequence number associated with the datatype offset; or a value indicating a number of IOVEC entries addressing a respective group of bytes of the message payload.

18. The NIC of claim 12, the circuitry further to:

determine that the datatype descriptor indicates a byte-mask to be used in creating the DMA instructions in response to determining that the datatype descriptor indicates the first type or the second type, wherein the byte-mask comprises bits indicating whether a corresponding byte of a data element is valid;

wherein the circuitry to create the DMA instructions corresponding to the instruction by executing operations in the nested loop is further to:

obtain a first series of offsets and lengths by applying the byte-mask to the operations in the nested loop; and create the DMA instructions based on the obtained first series of offsets and lengths; and wherein the circuitry to create the DMA instructions corresponding to the instruction based on addresses and lengths in the vector entries is further to:

obtain a second series of offsets and lengths by applying the byte-mask to the vector entries; and create the DMA instructions based on the obtained second series of offsets and lengths.

19. The NIC of claim 11, the circuitry further to:

transmit at least one of the created DMA instructions;

in response to transmitting the at least one created DMA instruction, the circuitry is further to:

recirculate the current context in response to determining that the current round of processing of the instruction has not completed or that processing of the instruction has not completed; and write the current context to the cache in response to determining that the current round of processing of the instruction has completed or that the processing of the instruction has completed.

20. A non-transitory computer-readable medium storing instructions to:

receive inputs including an instruction to read or write a payload of a message, a tracker state indicating a round of processing for the instruction, and a descriptor of a datatype defining organization of the message payload;

identify a current context and a processing state for the instruction;

in response to the datatype descriptor indicating a first type:

obtain the current context associated with the first type from a host memory or a cache;

set the processing state to a first execution state; and create direct memory access (DMA) instructions corresponding to the received instruction by executing operations in a nested loop which represents a multi-dimensional array structure of the first type; and in response to the datatype descriptor indicating a second type:

obtain the current context associated with the second type by fetching vector entries from a buffer;

set the processing state to a second execution state; and create the DMA instructions corresponding to the received instruction based on addresses and lengths in the vector entries of the second type.

* * * * *